US012451046B2

(12) United States Patent
Fang et al.

(10) Patent No.: US 12,451,046 B2
(45) Date of Patent: Oct. 21, 2025

(54) DRIVER MODULE AND DISPLAY DEVICE

(71) Applicants: Fuzhou BOE Optoelectronics Technology Co., Ltd., Fujian (CN); BOE TECHNOLOGY GROUP CO., LTD., Beijing (CN)

(72) Inventors: Xin Fang, Beijing (CN); Wenchao Wang, Beijing (CN); Sangjin Park, Beijing (CN); Jixiang Chen, Beijing (CN); Xiaolong Chen, Beijing (CN); Lixia Zhang, Beijing (CN)

(73) Assignees: Fuzhou BOE Optoelectronics Technology Co., Ltd., Fujian (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/577,661

(22) PCT Filed: Feb. 22, 2023

(86) PCT No.: PCT/CN2023/077608
§ 371 (c)(1),
(2) Date: Jan. 8, 2024

(87) PCT Pub. No.: WO2024/174119
PCT Pub. Date: Aug. 29, 2024

(65) Prior Publication Data

US 2025/0124843 A1 Apr. 17, 2025

(51) Int. Cl.
*G09G 3/3266* (2016.01)
*G09G 3/20* (2006.01)
*G09G 3/36* (2006.01)

(52) U.S. Cl.
CPC ......... *G09G 3/2092* (2013.01); *G09G 3/3266* (2013.01); *G09G 3/3677* (2013.01); *G09G 2310/0267* (2013.01)

(58) Field of Classification Search
CPC ............... G09G 3/3266; G09G 3/3677; G09G 2310/0286; G09G 3/2092; G11C 19/28
See application file for complete search history.

(56) References Cited

U.S. PATENT DOCUMENTS 10,621,941 B2 * 4/2020 Horiuchi ............... G02F 1/1368
11,328,682 B2 * 5/2022 Iwase .................. G09G 3/3696
(Continued)

FOREIGN PATENT DOCUMENTS

CN 1841565 A 10/2006
CN 104485079 A 4/2015
(Continued)

*Primary Examiner* — Xuemei Zheng
(74) *Attorney, Agent, or Firm* — McCoy Russell LLP

(57) ABSTRACT

A driver module includes a first driver unit and a first control unit; the first driver unit includes M levels of first driver circuits; M is a positive integer; m is a positive integer less than or equal to M; the m-th level first drive signal output terminal is electrically connected to a first terminal of an m-th row first gate line, to provide an m-th level first drive signal to the m-th row first gate line; the first control unit includes M first control circuits; an m-th first control circuit included in the first control unit is electrically connected to a second terminal of the m-th row first gate line, configured to control the second terminal of the m-th row first gate line to receive an ineffective voltage signal when a voltage value of the m-th level first drive signal changes from an effective voltage to an ineffective voltage.

19 Claims, 8 Drawing Sheets

(56) References Cited

U.S. PATENT DOCUMENTS

| | | | | |
|---|---|---|---|---|
| 11,410,627 | B2 | 8/2022 | Xiao et al. | |
| 2006/0220587 | A1 | 10/2006 | Tobita et al. | |
| 2014/0092082 | A1 * | 4/2014 | Choi | G09G 3/3696 345/99 |
| 2015/0340102 | A1 * | 11/2015 | Qian | G09G 3/3677 377/67 |
| 2018/0233208 | A1 | 8/2018 | Feng et al. | |
| 2019/0279589 | A1 * | 9/2019 | Kusumi | G09G 3/3677 |
| 2020/0098311 | A1 | 3/2020 | Hsu et al. | |
| 2021/0327384 | A1 | 10/2021 | Xie et al. | |
| 2022/0270531 | A1 | 8/2022 | Yao et al. | |
| 2023/0039922 | A1 | 2/2023 | Priefert et al. | |

FOREIGN PATENT DOCUMENTS

| | | | | |
|---|---|---|---|---|
| CN | 105139823 | A | 12/2015 | |
| CN | 105489156 | A | 4/2016 | |
| CN | 206833892 | U * | 1/2018 | G09G 3/20 |
| CN | 108806628 | A | 11/2018 | |
| CN | 108877639 | A | 11/2018 | |
| CN | 109272921 | A | 1/2019 | |
| CN | 110085156 | A | 8/2019 | |
| CN | 111210752 | A | 5/2020 | |
| CN | 112419994 | A | 2/2021 | |
| CN | 113409733 | A | 9/2021 | |
| CN | 114974055 | A | 8/2022 | |
| CN | 115686263 | A | 2/2023 | |
| CN | 115706580 | A | 2/2023 | |
| JP | 2008040498 | A | 2/2008 | |
| KR | 20020014330 | A | 2/2002 | |
| KR | 20160043265 | A | 4/2016 | |

* cited by examiner

DRIVER MODULE AND DISPLAY DEVICE

CROSS REFERENCE TO RELATED APPLICATION

This application is the U.S. national phase of PCT Application No. PCT/CN2023/077608 filed on Feb. 22, 2023.

TECHNICAL FIELD

The present disclosure relates to the field of display technologies, in particular to a driver module and a display device.

BACKGROUND

In related art, Gate On Array (GOA) bilateral cross drive has an advantage that it can achieve narrow bezels and has low requirements for driver integrated circuits (ICs), and has a disadvantage that single-sided GOA drive can cause large signal delay at a far terminal of a gate line, especially the delay in a falling edge of a gate pulse signal provided by the gate line, which easily leads to poor display due to far-terminal signal overcharging, pixel voltage differences between the far and near terminals, and other reasons. It is needed to improve the poor display caused by the large signal delay at the far terminal of the gate line when the single-sided GOA drive is adopted.

SUMMARY

In one aspect, embodiments of the present disclosure provide a driver module applied to a display device, the driver module includes a first driver unit and a first control unit; the first driver unit includes M levels of first driver circuits; an m-th level first driver circuit includes an m-th level first drive signal output terminal; M is a positive integer; m is a positive integer less than or equal to M;

the m-th level first drive signal output terminal is electrically connected to a first terminal of an m-th row first gate line, configured to provide an m-th level first drive signal to the m-th row first gate line through the m-th level first drive signal output terminal;

the first control unit includes M first control circuits;

an m-th first control circuit included in the first control unit is electrically connected to a second terminal of the m-th row first gate line, configured to control the second terminal of the m-th row first gate line to receive an ineffective voltage signal when a voltage value of the m-th level first drive signal changes from an effective voltage to an ineffective voltage;

the first terminal and the second terminal are opposite terminals.

Optionally, the driver module further includes N rows of second gate lines; the driver module further includes a second driver unit and a second control unit; the second driver unit includes N levels of second driver circuits; an n-th level second driver circuit includes an n-th level second drive signal output terminal; N is a positive integer; n is a positive integer less than or equal to N;

the n-th level second drive signal output terminal is electrically connected to a second terminal of an n-th row second gate line, configured to provide an n-th level second drive signal to the n-th row second gate line through the n-th level second drive signal output terminal;

the second control unit includes N second control circuits;

an n-th second control circuit included in the second control unit is electrically connected to a first terminal of the n-th row second gate line, configured to control the first terminal of the n-th row second gate line to receive an ineffective voltage signal when a voltage value of the n-th level second drive signal changes from an effective voltage to an ineffective voltage.

Optionally, the m-th first control circuit is configured to control a connection between the second terminal of the m-th row first gate line and a first voltage signal terminal under control of an m-th first control signal provided by an m-th first control terminal.

Optionally, the m-th first control circuit includes an m-th first control transistor;

a gate of the m-th first control transistor is electrically connected to the m-th first control terminal, a first pole of the m-th first control transistor is electrically connected to the second terminal of the m-th row first gate line, and a second pole of the m-th first control transistor is electrically connected to the first voltage signal terminal.

Optionally, the m-th level first driver circuit is electrically connected to an m-th level first output clock signal line, configured to control the m-th level first output clock signal line to provide an m-th level first output clock signal to the m-th level first drive signal output terminal under control of a potential of an m-th level first pull-up node;

the m-th first control terminal is electrically connected to an m-th first control clock signal line;

the m-th first control clock signal line is configured to provide an m-th first control clock signal;

the m-th level first output clock signal and the m-th first control clock signal are reciprocal signals.

Optionally, the first voltage signal terminal is a DC voltage signal terminal, and the first voltage signal terminal is configured to provide an ineffective voltage signal.

Optionally, the first voltage signal terminal is electrically connected to the m-th level first output clock signal line.

Optionally, the m-th level first driver circuit includes an m-th level first driver transistor;

a gate of the m-th level first driver transistor is electrically connected to the m-th level first pull-up node, a first pole of the m-th level first driver transistor is electrically connected to the m-th level first output clock signal line, and a second pole of the m-th level first driver transistor is electrically connected to the m-th level first drive signal output terminal;

a channel width of the m-th first control transistor is greater than or equal to a first width but less than or equal to a second width;

a channel length of the m-th first control transistor is greater than a channel length of the m-th level first driver transistor;

the first width is half of a channel width of the m-th level first driver transistor;

the second width is 1.5 times the channel width of the m-th level first driver transistor.

Optionally, the n-th second control circuit is configured to control a connection between the first terminal of the n-th row second gate line and a second voltage signal terminal under control of an n-th second control signal provided by an n-th second control terminal.

Optionally, the n-th second control circuit includes an n-th second control transistor; a gate of the n-th second control transistor is electrically connected to the n-th second control terminal, a first pole of the n-th second control transistor is electrically connected to the first terminal of the n-th row second gate line, and a second pole of the n-th second control transistor is electrically connected to the second voltage signal terminal.

Optionally, the n-th level second driver circuit is electrically connected to an n-th level second output clock signal line, configured to control the n-th level second output clock signal line to provide an n-th level second output clock signal to the n-th level second drive signal output terminal under control of a potential of an n-th level second pull-up node;

the n-th second control terminal is electrically connected to an n-th second control clock signal line;

the n-th second control clock signal line is configured to provide an n-th second control clock signal;

the n-th level second output clock signal and the n-th second control clock signal are reciprocal signals.

Optionally, the second voltage signal terminal is a DC voltage signal terminal, and the second voltage signal terminal is configured to provide an ineffective voltage signal.

Optionally, the second voltage signal terminal is electrically connected to the n-th level second output clock signal line.

Optionally, the n-th level second driver circuit includes an n-th level second driver transistor;

a gate of the n-th level second driver transistor is electrically connected to the n-th level second pull-up node, a first pole of the n-th level second driver transistor is electrically connected to the n-th level second output clock signal line, and a second pole of the n-th level second driver transistor is electrically connected to the n-th level second drive signal output terminal;

a channel width of the n-th second control transistor is greater than or equal to a third width but less than or equal to a fourth width;

a channel length of the n-th second control transistor is greater than a channel length of the n-th level second driver transistor;

the third width is half of a channel width of the n-th level second driver transistor;

the fourth width is 1.5 times the channel width of the n-th level second driver transistor.

Optionally, an a-th first control circuit included in the first control unit is configured to control a connection between a second terminal of an a-th row first gate line and a first voltage signal terminal under control of an a-th first control signal provided by an a-th first control terminal;

an a-th level first driver circuit included in the first driver unit is electrically connected to an a-th level first output clock signal line, configured to control the a-th level first output clock signal line to provide an a-th level first output clock signal to an a-th level first drive signal output terminal under control of a potential of an a-th level first pull-up node;

a b-th level second driver circuit included in the second driver unit is electrically connected to a b-th level second output clock signal line, configured to control the b-th level second output clock signal line to provide a b-th level second output clock signal to a b-th level second drive signal output terminal under control of a potential of a b-th level second pull-up node;

the a-th level first output clock signal line is configured to provide the a-th level first output clock signal, the b-th level second output clock signal line is configured to provide the b-th level second output clock signal, and the a-th level first output clock signal and the b-th level second output clock signal are reciprocal signals;

the a-th first control terminal is electrically connected to a b-th level second drive signal terminal included in the b-th level second driver circuit;

a and b are positive integers.

Optionally, the a-th first control circuit includes an a-th first control transistor;

a gate of the a-th first control transistor is electrically connected to the b-th level second drive signal terminal, a first pole of the a-th first control transistor is electrically connected to the second terminal of the a-th row first gate line, and a second pole of the a-th first control transistor is electrically connected to the first voltage signal terminal.

Optionally, a c-th second control circuit included in the second control unit is configured to control a connection between a first terminal of a c-th row second gate line and a second voltage signal terminal under control of a c-th second control signal provided by a c-th second control terminal;

a c-th level second driver circuit included in the second driver unit is electrically connected to a c-th level second output clock signal line, configured to control the c-th level second output clock signal line to provide a c-th level second output clock signal to a c-th level second drive signal output terminal under control of a potential of a c-th level second pull-up node;

a d-th level first driver circuit included in the first driver unit is electrically connected to a d-th level first output clock signal line, configured to control the d-th level first output clock signal line to provide a d-th level first output clock signal to a d-th level first drive signal output terminal under control of a potential of a d-th level first pull-up node;

the d-th level first output clock signal line is configured to provide the d-th level first output clock signal, the c-th level second output clock signal line is configured to provide the c-th level second output clock signal, and the d-th level first output clock signal and the c-th level second output clock signal are reciprocal signals;

the c-th second control terminal is electrically connected to a d-th level first drive signal terminal included in the d-th first driver circuit;

c and d are positive integers.

Optionally, the c-th second control circuit includes a c-th second control transistor; a gate of the c-th second control transistor is electrically connected to the d-th level first drive signal terminal, a first pole of the c-th second control transistor is electrically connected to the first terminal of the c-th row second gate line, and a second pole of the c-th second control transistor is electrically connected to the second voltage signal terminal.

Optionally, an a-th first control circuit included in the first control unit is configured to control a connection between a second terminal of the a-th row first gate line and a first voltage signal terminal under control of an a-th first control signal provided by an a-th first control terminal;

an a-th level first driver circuit included in the first driver unit is electrically connected to an a-th level first output clock signal line, configured to control the a-th level first output clock signal line to provide an a-th level first output clock signal to an a-th level first drive signal output terminal under control of a potential of an a-th level first pull-up node;

an e-th level first driver circuit included in the first driver unit is electrically connected to an e-th level first output clock signal line, configured to control the e-th level first output clock signal line to provide an e-th level first output clock signal to an e-th level first drive signal output terminal under control of a potential of an e-th level first pull-up node;

the a-th level first output clock signal line is configured to provide the a-th level first output clock signal, the e-th level first output clock signal line is configured to provide the e-th level first output clock signal, and the a-th level first output clock signal and the e-th level first output clock signal are reciprocal signals;

the a-th first control terminal is electrically connected to an e-th level first drive signal terminal included in the e-th level first driver circuit;

a and e are positive integers.

Optionally, the a-th first control circuit includes an a-th first control transistor;

a gate of the a-th first control transistor is electrically connected to the e-th level first drive signal terminal, a first pole of the a-th first control transistor is electrically connected to the second terminal of the a-th row first gate line, and a second pole of the a-th first control transistor is electrically connected to the first voltage signal terminal.

Optionally, a c-th second control circuit included in the second control unit is configured to control a connection between a first terminal of the c-th row second gate line and a second voltage signal terminal under control of a c-th second control signal provided by a c-th second control terminal;

a c-th level second driver circuit included in the second driver unit is electrically connected to a c-th level second output clock signal line, configured to control the c-th level second output clock signal line to provide a c-th level second output clock signal to a c-th level second drive signal output terminal under control of a potential of a c-th level second pull-up node;

an f-th level second driver circuit included in the second driver unit is electrically connected to an f-th level second output clock signal line, configured to control the f-th level second output clock signal line to provide an f-th level second output clock signal to an f-th level second drive signal output terminal under control of a potential of an f-th level second pull-up node;

the c-th level second output clock signal line is configured to provide the c-th level second output clock signal, the f-th level second output clock signal line is configured to provide the f-th level second output clock signal, and the c-th level second output clock signal and the f-th level second output clock signal are reciprocal signals;

the c-th second control terminal is electrically connected to an f-th level second drive signal terminal included in the f-th level second driver circuit;

c and f are positive integers.

Optionally, the c-th second control circuit includes a c-th second control transistor; a gate of the c-th second control transistor is electrically connected to the f-th level second drive signal terminal, a first pole of the c-th second control transistor is electrically connected to the first terminal of the c-th row second gate line, and a second pole of the c-th second control transistor is electrically connected to the second voltage signal terminal.

In a second aspect, the embodiments of the present disclosure provide a display device including the aforementioned driver module.

DETAILED DESCRIPTION

Figure 1:
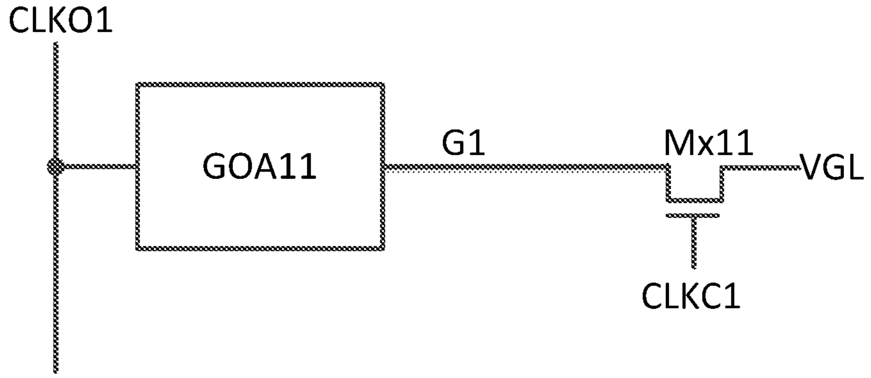
FIG. 1 is a schematic diagram of a connection relationship among a first-level first driver circuit, a first row gate line, and a first first-control transistor included in a first first-control circuit in the driver module provided by the disclosure.

The following clearly and completely describes the technical solutions in the embodiments of this application with reference to the accompanying drawings in the embodiments of this application. Obviously, the described embodiments are only a part of the embodiments of the present disclosure, rather than all of them. Based on the embodiments in the present disclosure, all other embodiments obtained by those of ordinary skill in the art without creative work shall fall within the protection scope of the present disclosure.

The transistors used in all embodiments of this disclosure can be thin film transistors, field-effect transistors, or other devices with similar characteristics. In the disclosed embodiments, in order to distinguish between two poles of a transistor except for a gate, one pole is referred to as a first pole and the other pole is referred to as a second pole.

In practical operation, when the transistor is a thin film transistor or field-effect transistor, the first pole can be a drain electrode, and the second pole can be a source electrode; Alternatively, the first pole can be a source electrode, and the second pole can be a drain electrode.

A driver module described in the present disclosed embodiments is applied to a display device, the display device includes M rows of first gate lines; the driver module includes a first driver unit and a first control unit; the first driver unit includes M levels of first driver circuits; an m-th level first driver circuit includes an m-th level first drive signal output terminal; M is a positive integer; m is a positive integer less than or equal to M;

The m-th level first drive signal output terminal is electrically connected to a first terminal of an m-th row first gate line, configured to provide an m-th level first drive signal to the m-th row first gate line through the m-th level first drive signal output terminal; The first control unit includes M first control circuits;

An m-th first control circuit included in the first control unit is electrically connected to a second terminal of the m-th row first gate line, configured to control the second terminal of the m-th row first gate line to receive an ineffective voltage signal when a voltage value of the m-th level first drive signal changes from an effective voltage to an ineffective voltage;

The first terminal and the second terminal are opposite terminals.

The driver module described in the disclosed embodiments adopts the first control unit, the first control unit includes M first control circuits. The m-th first control circuit is electrically connected to the second terminal of the m-th row first gate line. When the voltage value of the m-th level first drive signal changes from an effective voltage to an ineffective voltage, the second terminal of the m-th row first gate line is controlled to receive an ineffective voltage signal, so that a far-terminal signal drops simultaneously.

In at least one embodiment disclosed herein, the effective voltage may be a high voltage, and the ineffective voltage may be a low voltage, but not limited to this. In specific implementation, the effective voltage can also be a low voltage, and the ineffective voltage can also be a high voltage.

In the disclosed embodiments, the first control unit can simultaneously control a drop of the far-terminal signal when a near-terminal signal drops.

In related technologies, an advantage of GOA (Gate On Array, gate on array) bilateral cross drive is that it can achieve narrow borders and has low requirements for driving ICs (Integrated Circuit, integrated circuit). A disadvantage is that single-sided GOA drive can cause large signal delay at a far terminal of a gate line, especially the delay in a falling edge of a gate microphone signal provided by the gate line, which can easily lead to poor display due to far-terminal signal overcharging, pixel voltage differences between the far and near terminals, and other reasons. The disclosed embodiments achieve a technical effect of reducing far-terminal signal delay by designing a control circuit (the control circuit may include a control transistor) at the far terminal of the gate line. When a potential of a gate drive signal provided by the gate line is pulled down, both the far and near terminals are simultaneously pulled down.

In related technologies, in order to meet a demand for ultra-narrow borders, GOA designs with GOA bilateral cross drive are usually adopted.

The GOA design with GOA bilateral cross drive can refer to: setting a first driver unit on the left side of a display area and a second driver unit on the right side of the display area. The first driver unit can be configured to provide a drive signal to odd row gate lines or even row gate lines, and the second driver unit can be configured to provide a drive signal to even row gate lines or odd row gate lines.

The driver module described in the disclosed embodiments can meet narrow borders and ensure a drive capability of the far terminal, therefore, it can be applied to medium and large-sized display products (such as TV (TV)/MNT (monitor, monitor)). Compared to the commonly used GOA design with GOA bilateral cross drive for medium and large-sized products, the driver module described in the disclosed embodiments has a technical advantage of a narrow border. The driver module described in the disclosed embodiments can also be applied to small-sized display products.

In at least one embodiment disclosed herein, the first terminal may be a left terminal, the second terminal may be a right terminal, or the first terminal may be a left terminal, and the second terminal may be a right terminal. In at least one embodiment disclosed herein, the first terminal may be the left terminal and the second terminal may be the right terminal as an example for explanation.

In at least one embodiment disclosed herein, the display device further includes N rows of second gate lines; the driver module further includes a second driver unit and a second control unit; the second driver unit includes N levels of second driver circuits; an n-th level second driver circuit includes an n-th level second drive signal output terminal; N is a positive integer; n is a positive integer less than or equal to N;

The n-th level second drive signal output terminal is electrically connected to a second terminal of an n-th row second gate line, configured to provide an n-th level second drive signal to the n-th row second gate line through the n-th level second drive signal output terminal;

The second control unit includes N second control circuits;

An n-th second control circuit included in the second control unit is electrically connected to a first terminal of the n-th row second gate line, configured to control the first terminal of the n-th row second gate line to receive an ineffective voltage signal when a voltage value of the n-th level second drive signal changes from an effective voltage to an ineffective voltage.

The driver module described in the disclosed embodiments adopts the second control unit, the second control unit includes N second control circuits. The n-th second control circuit is electrically connected to the first terminal of the n-th row second gate line. When the voltage value of the n-th level second drive signal changes from an effective voltage to an ineffective voltage, the first terminal of the n-th row second gate line is controlled to receive an ineffective voltage signal, so that a far-terminal signal drops simultaneously.

In at least one embodiment disclosed herein, the m-th first control circuit is configured to control a connection between the second terminal of the m-th row first gate line and a first voltage signal terminal under control of an m-th first control signal provided by an m-th first control terminal.

In specific implementation, the m-th first control circuit can control the connection between the second terminal of the m-th row first gate line and the first voltage signal terminal under the control of the m-th first control signal.

Optionally, the first voltage signal terminal may be a low voltage line, but not limited to this.

Optionally, the m-th first control circuit includes an m-th first control transistor;

A gate of the m-th first control transistor is electrically connected to the m-th first control terminal, a first pole of the m-th first control transistor is electrically connected to the second terminal of the m-th row first gate line, and a second pole of the m-th first control transistor is electrically connected to the first voltage signal terminal.

In at least one embodiment disclosed herein, the m-th level first driver circuit is electrically connected to an m-th level first output clock signal line, configured to control the m-th level first output clock signal line to provide an m-th level first output clock signal to the m-th level first drive signal output terminal under control of a potential of an m-th level first pull-up node;

The m-th first control terminal is electrically connected to an m-th first control clock signal line;

The m-th first control clock signal line is configured to provide an m-th first control clock signal;

The m-th level first output clock signal and the m-th first control clock signal are reciprocal signals.

In specific implementation, under the control of the potential of the m-th level first pull-up node, the m-th level first driver circuit controls a supply of the m-th level first output clock signal to an m-th level first drive signal terminal. The m-th first control terminal is electrically connected to the m-th first control clock signal line, and the m-th level first output clock signal and the m-th first control clock signal are reciprocal signals.

In at least one embodiment disclosed herein, a definition of two signals as reciprocal signals is: when one signal is on a falling edge, the other signal is on a rising edge, but each falling edge of one signal does not necessarily correspond to the rising edge of the other signal;

The present disclosure is not limited to this.

Optionally, the first voltage signal terminal is a DC voltage signal terminal, and the first voltage signal terminal is configured to provide an ineffective voltage signal.

In specific implementation, the first voltage signal terminal can be a DC signal voltage terminal that provides an ineffective voltage signal. For example, the ineffective voltage signal can be a low voltage signal.

In at least one embodiment disclosed herein, the first voltage signal terminal is electrically connected to the m-th level first output clock signal line.

In specific implementation, the first voltage signal terminal can be electrically connected to the m-th level first output clock signal line.

As shown in FIG. 1, a first-level first driver circuit GOA11 is electrically connected to a first level first output clock signal line CLKO1, the first-level first driver circuit GOA11 is configured to control the first level first output clock signal line CLKO1 to provide a first level first output clock signal to a first level first drive signal output terminal under control of a potential of a first level first pull-up node;

GOA11 is electrically connected to a first terminal of a first row gate line G1;

A first first-control circuit includes a first first-control transistor Mx11;

A gate of the first first-control transistor Mx11 is electrically connected to a first level first control clock signal line CLKC1, a source of the first first-control transistor Mx11 is electrically connected to a second terminal of the first row gate line G1, and a drain of the first first-control transistor Mx11 is electrically connected to the low-voltage line VGL.

In at least one embodiment shown in FIG. 1, the first terminal may be a left terminal and the second terminal may be a right terminal.

In at least one embodiment shown in FIG. 1, the first voltage signal terminal is a low voltage signal terminal.

In at least one embodiment shown in FIG. 1, the first level first output clock signal provided by the first level first output clock signal line CLKO1 and the first first-control clock signal provided by the first level first control clock signal line CLKC1 are reciprocal signals.

Figure 2:
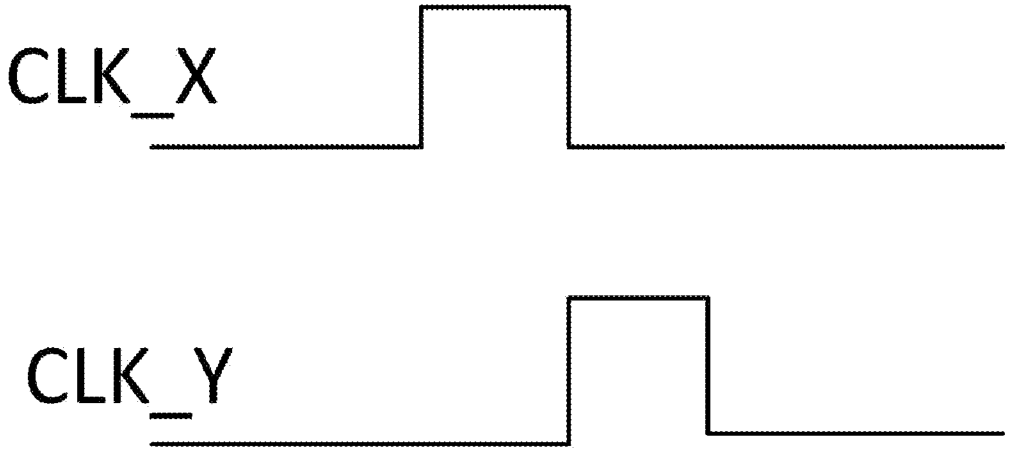
FIG. 2 is a schematic diagram of reciprocal signals.

The disclosed embodiments define two clock signals with reciprocal signal characteristics, as shown in FIG. 2, the clock signal CLK_X that is earlier in time and the clock signal CLK_Y that is later in time are reciprocal signals;

During a period before the falling edge of CLK_X, the potential of CLK_X is high and the potential of CLK_Y is low;

At the falling edge of CLK_X, the potential of CLK_Y rises from low to high, meaning that the falling edge of CLK_X overlaps with the rising edge of CLK_Y in time;

For a period of time after the falling edge of CLK_X, the potential of CLK_Y is high.

In at least one embodiment disclosed herein, assuming that the first driver unit and the second driver unit use p clock signals, p can be equal to 4, 8, 12, or 16; P is a positive integer;

When a duty cycle of each clock signal is p/2/p, a first clock signal CLK1 and a (1+p/2)-th clock signal CLK (1+p/2) are reciprocal signals, a second clock signal CLK2 and a (2+p/2)-th clock signal CLK (2+p/2) are reciprocal signals, and a (p/2)-th clock signal CLK (p/2) and a p-th clock signal CLKp are reciprocal signals.

When the duty cycle of each clock signal is (p/2-1)/p, the first clock signal CLK1 and the (p/2)-th clock signal CLK (p/2) are reciprocal signals, the second clock signal CLK2 and the (1+p/2)-th clock signal CLK (1+p/2) are reciprocal signals, the (p/2)-th clock signal CLK (p/2) and a (p−1)-th clock signal CLK (p−1) are reciprocal signals, and the (1+p/2)-th clock signal CLK (1+p/2) and the p-th clock signal CLKp are reciprocal signals, the (2+p/2)-th clock signal CLK (2+p/2) and the first clock signal CLK1 are reciprocal signals, the p-th clock signal CLKp and the (p/2−1)-th clock signal CLK (p/2−1) are reciprocal signals;

When the duty cycle of each clock signal is (p/2−2)/p, the first clock signal CLK1 and the (p/2−1)-th clock signal CLK (p/2−1) are reciprocal signals, the second clock signal CLK2 and the (p/2)-th clock signal CLK (p/2) are reciprocal signals, and the (p/2)-th clock signals CLK (p/2) and a (p−2)-th clock signal CLK (p−2) are reciprocal signals, the (1+p/2)-th clock signal CLK (1+p/2) and the (p−1)-th clock signal CLK (p−1) are reciprocal signals, the (2+p/2)-th clock signal CLK (2+p/2) and the p-th clock signal CLKp are reciprocal signals, and the p-th clock signal CLKp and the (p/2−2)-th clock signal CLK (p/2−2) are reciprocal signals;

Similarly, when the duty cycle of each clock signal is 1/p, the first clock signal CLK1 and the second clock signal CLK2 are reciprocal signals, the second clock signal CLK2 and a third clock signal CLK3 are reciprocal signals, and a (m/2)-th clock signal CLK (m/2) and the first clock signal CLK1 are reciprocal signals;

Optionally, the m-th level first driver circuit includes an m-th level first driver transistor;

A gate of the m-th level first driver transistor is electrically connected to the m-th level first pull-up node, a first pole of the m-th level first driver transistor is electrically connected to the m-th level first output clock signal line, and a second pole of the m-th level first driver transistor is electrically connected to the m-th level first drive signal output terminal;

A channel width of the m-th first control transistor is greater than or equal to a first width but less than or equal to a second width;

A channel length of the m-th first control transistor is greater than a channel length of the m-th level first driver transistor;

The first width is half of a channel width of the m-th level first driver transistor;

The second width is 1.5 times the channel width of the m-th level first driver transistor.

In specific implementation, in order to ensure the effect of pulling down the far terminal of the gate line, an on-state current provided by the first control transistor needs to be equivalent to an on-state current of the first driver transistor on the near terminal;

The channel width of the m-th first control transistor can be equivalent to the channel width of the m-th level first driver transistor, and the channel length of the m-th first control transistor is greater than the channel length of the m-th level first driver transistor;

Moreover, due to the presence of the first control transistor, there is a risk of leaking electricity in a gate drive signal compared to single-sided drive designs without the first control transistor. Therefore, in order to reduce the impact of leaking electricity, the channel length of the m-th first control transistor can be greater than the channel length of the m-th level first driver transistor. At this time, the channel width of the m-th first control transistor can be equivalent to the channel width of the m-th level first driver transistor.

At least one embodiment of this disclosure does not have any special requirements for the GOA architecture, and existing bilateral simultaneous driven GOA architectures and bilateral cross driven GOA architectures can be applied.

In at least one embodiment disclosed herein, the n-th second control circuit is configured to control a connection between the first terminal of the n-th row second gate line and a second voltage signal terminal under control of an n-th second control signal provided by an n-th second control terminal.

In specific implementation, the n-th second control circuit can control the connection between the first terminal of the n-th row second gate line and the second voltage signal terminal under the control of the n-th second control signal.

Optionally, the second voltage signal terminal can be a low voltage line, but not limited to this.

Optionally, the n-th second control circuit includes an n-th second control transistor;

The gate of the n-th second control transistor is electrically connected to the n-th second control terminal, the first pole of the n-th second control transistor is electrically connected to the first terminal of the n-th row second gate line, and the second pole of the n-th second control transistor is electrically connected to the second voltage signal terminal.

In at least one embodiment disclosed herein, the n-th level second driver circuit is electrically connected to an n-th level second output clock signal line, configured to control the n-th level second output clock signal line to provide an n-th level second output clock signal to the n-th level second drive signal output terminal under control of a potential of an n-th level second pull-up node;

The n-th second control terminal is electrically connected to an n-th second control clock signal line;

The n-th second control clock signal line is configured to provide an n-th second control clock signal;

The n-th level second output clock signal and the n-th second control clock signal are reciprocal signals.

Optionally, the second voltage signal terminal is a DC voltage signal terminal, and the second voltage signal terminal is configured to provide an ineffective voltage signal. For example, the ineffective voltage signal can be a low voltage signal;

In at least one embodiment disclosed herein, the second voltage signal terminal is electrically connected to the n-th level second output clock signal line.

Optionally, the duty cycle of each clock signal is less than or equal to 50%.

Figure 3:
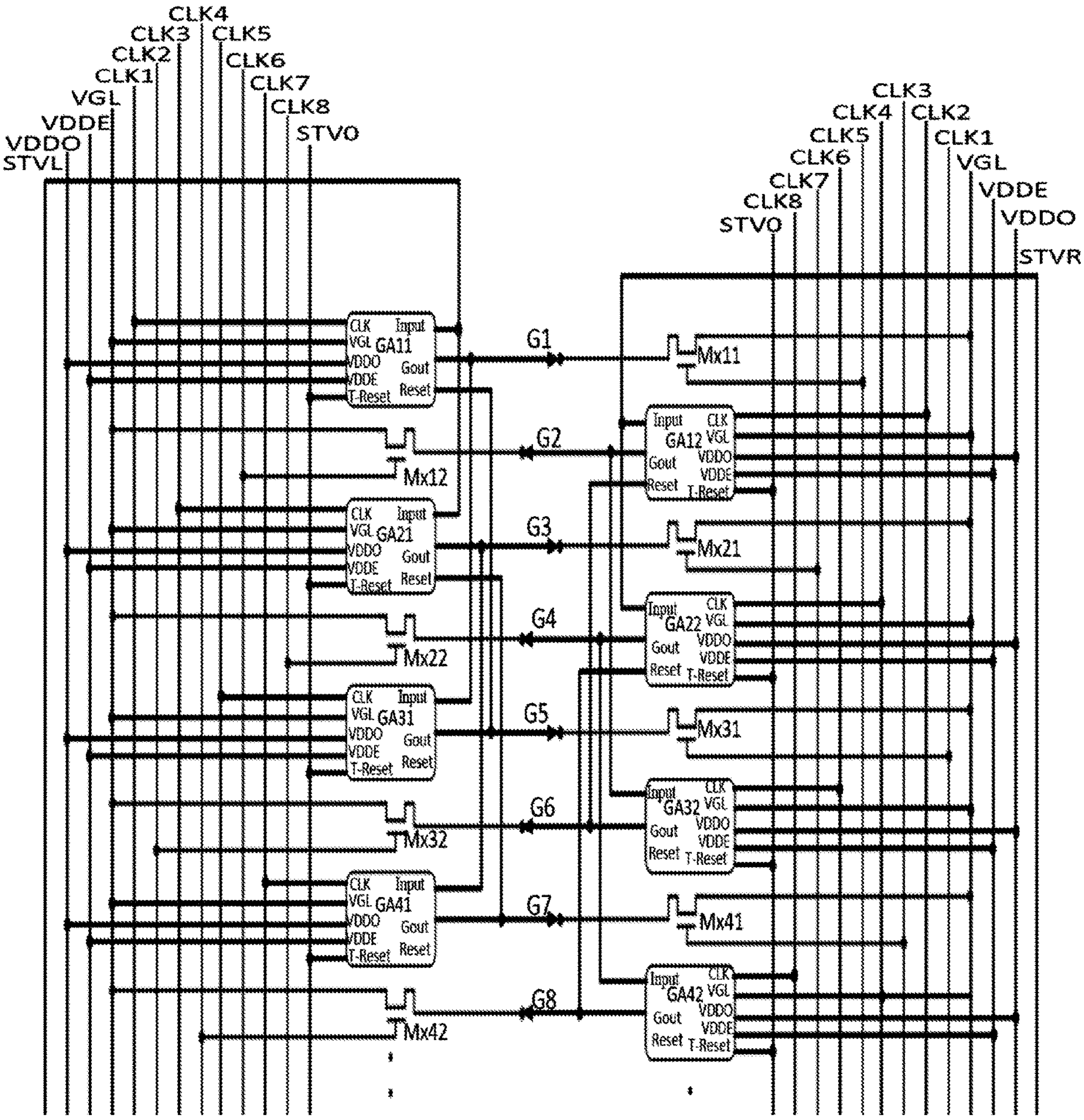
FIG. 3 is a circuit diagram of the driver module according to at least one embodiment of the present disclosure.

When the first driver unit and the second driver unit use 8 clock signals, and the duty cycle of each clock signal is 50%, CLK1 and CLK5 are reciprocal signals, CLK2 and CLK6 are reciprocal signals, CLK3 and CLK7 are reciprocal signals, and CLK4 and CLK8 are reciprocal signals;

As shown in FIG. 3, the first driver unit includes a first-level first driver circuit GA11, a second level first driver circuit GA21, a third level first driver circuit GA31, and a fourth level first driver circuit GA41;

The second driver unit includes a first level second driver circuit GA12, a second level second driver circuit GA22, a third level second driver circuit GA32, and a fourth level second driver circuit GA42;

- GA11 is electrically connected to a first clock signal line CLK1, that is, the first level first output clock signal line electrically connected to GA11 is the first clock signal line CLK1;
- GA21 is electrically connected to a third clock signal line CLK3, that is, a second level first output clock signal line electrically connected to GA21 is the third clock signal line CLK3;
- GA31 is electrically connected to a fifth clock signal line CLK5, that is, a third level first output clock signal line electrically connected to GA31 is the fifth clock signal line CLK5;
- GA41 is electrically connected to a seventh clock signal line CLK7, that is, a fourth level first output clock signal line electrically connected to GA41 is the seventh clock signal line CLK7;
- GA12 is electrically connected to a second clock signal line CLK2, that is, a first level second output clock signal line electrically connected to GA12 is the second clock signal line CLK2;
- GA22 is electrically connected to a fourth clock signal line CLK4, that is, a second level second output clock signal line electrically connected to GA22 is the fourth clock signal line CLK4;
- GA32 is electrically connected to a sixth clock signal line CLK6, that is, a third level second output clock signal line electrically connected to GA32 is the sixth clock signal line CLK6;
- GA42 is electrically connected to an eighth clock signal line CLK8, that is, a fourth level second output clock signal line electrically connected to GA42 is the eighth clock signal line CLK8;

The first control unit includes the first first-control circuit, a second first-control circuit, a third first-control circuit, and a fourth first-control circuit;

The second control unit includes a first second-control circuit, a second second-control circuit, a third second-control circuit, and a fourth second-control circuit;

The first first-control circuit includes the first first-control transistor Mx11, the second first-control circuit includes a second first-control transistor Mx21, the third first-control circuit includes a third first-control transistor Mx31, and the fourth first-control circuit includes a fourth first-control transistor Mx41;

The first second-control circuit includes a first second-control transistor Mx12, the second second-control circuit includes a second second-control transistor Mx22, the third second-control circuit includes a third second-control transistor Mx32, and the fourth second-control circuit includes a fourth second-control transistor Mx42;

A drive signal output terminal of GA11 is electrically connected to the left terminal of the first row gate line G1, a drive signal output terminal of GA21 is electrically connected to a left terminal of a third row gate line G3, a drive signal output terminal of GA31 is electrically connected to a left terminal of a fifth row gate line G5, and a drive signal output terminal of GA41 is electrically connected to the left terminal of the fifth row gate line G5;

A drive signal output terminal of GA12 is electrically connected to a right terminal of a second row gate line G2, a drive signal output terminal of GA22 is electrically connected to a right terminal of a fourth row gate line G4, a drive signal output terminal of GA32 is electrically connected to a right terminal of a sixth row gate line G6, and a drive signal output terminal of GA42 is electrically connected to the right terminal of the fourth row gate line G4;

A gate of Mx11 is electrically connected to the fifth clock signal line CLK5, a source of Mx11 is electrically connected to a right terminal of the first row gate line G1, and a drain of Mx11 is electrically connected to the low-voltage line VGL;

A gate of Mx21 is electrically connected to the seventh clock signal line CLK7, a source of Mx21 is electrically connected to a right terminal of the third row gate line G3, and a drain of Mx21 is electrically connected to the low-voltage line VGL;

A gate of Mx31 is electrically connected to the first clock signal line CLK1, a source of Mx31 is electrically connected to a right terminal of the fifth row gate line G5, and a drain of Mx31 is electrically connected to the low-voltage line VGL;

A gate of Mx41 is electrically connected to the third clock signal line CLK3, a source of Mx41 is electrically connected to a right terminal of a seventh row gate line G7, and a drain of Mx41 is electrically connected to the low-voltage line VGL;

A gate of Mx12 is electrically connected to the sixth clock signal line CLK6, a source of Mx12 is electrically connected to a left terminal of the second row gate line G2, and a drain of Mx12 is electrically connected to the low-voltage line VGL;

A gate of Mx22 is electrically connected to the eighth clock signal line CLK8, a source of Mx22 is electrically connected to a left terminal of the fourth row gate line G4, and a drain of Mx22 is electrically connected to the low-voltage line VGL;

A gate of Mx32 is electrically connected to the second clock signal line CLK2, a source of Mx32 is electrically connected to a left terminal of the sixth row gate line G6, and a drain of M32 is electrically connected to the low-voltage line VGL;

A gate of Mx42 is electrically connected to the fourth clock signal line CLK4, a source of Mx42 is electrically connected to a left terminal of an eighth row gate line G8, and a drain of M42 is electrically connected to the low-voltage line VGL.

In at least one embodiment shown in FIG. 3, all transistors are n-type transistors, but not limited to this.

In at least one embodiment shown in FIG. 3, the symbol STV0 is a frame starting voltage terminal, the symbol VDDO is a first control voltage terminal, the symbol VDDE is a second control voltage terminal, the symbol STVR is a right starting voltage terminal, and the symbol STVL is a left starting voltage terminal.

In FIG. 3, each first control transistor is set on the right side, and each second control transistor is set on the left side. That is to say, each first control transistor is set on the opposite side of a first driver module, and each second control transistor is set on the opposite side of a second driver module.

In at least one embodiment disclosed herein, the symbol CLK is a clock signal input terminal, the symbol T-Reset is a frame reset terminal, the symbol Input is the input terminal, the symbol Gout is the drive signal output terminal, and the symbol Reset is a reset terminal.

Figure 4:
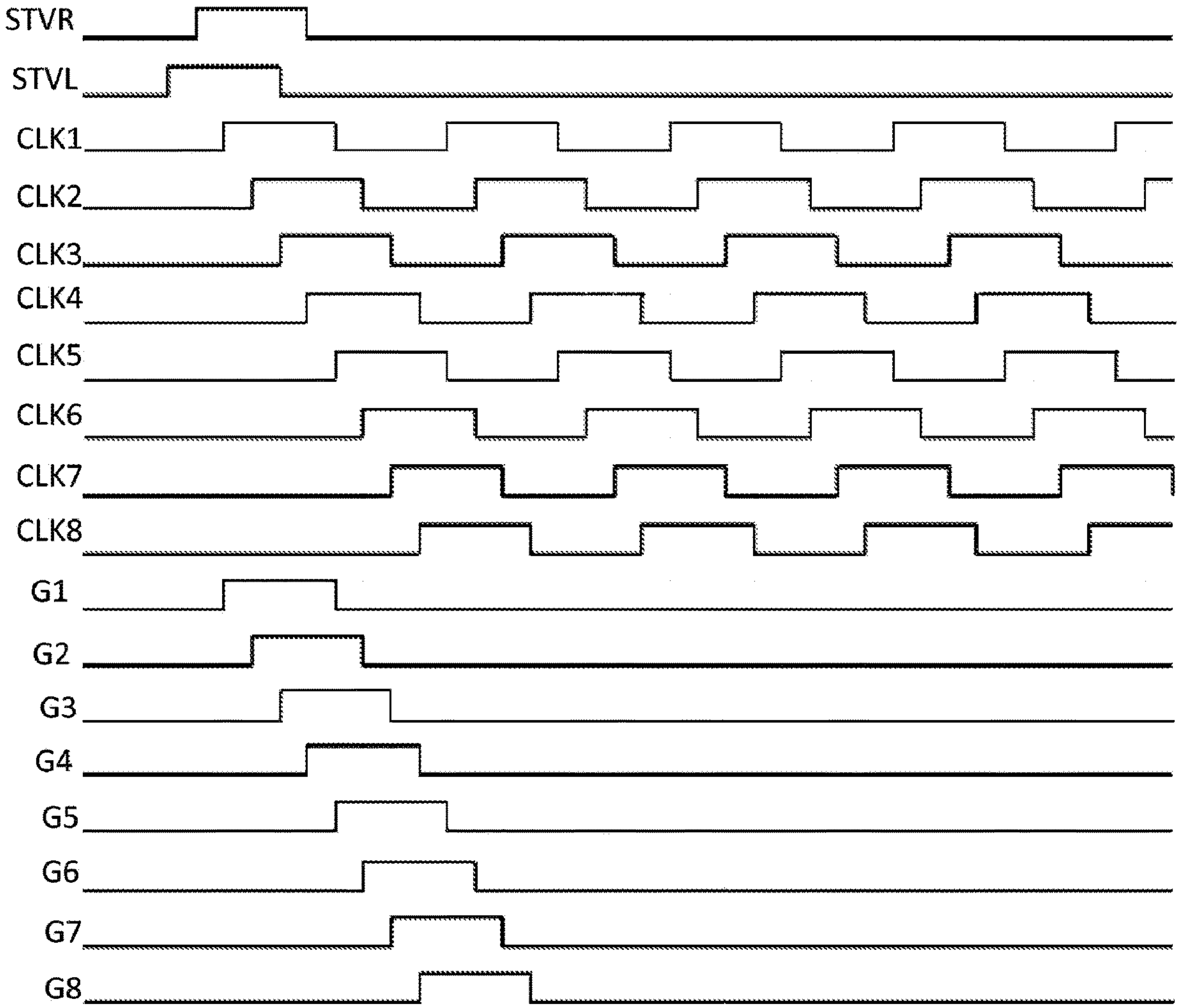
FIG. 4 is a working sequence diagram of at least one embodiment of the driver module shown in FIG. 3.

FIG. 4 is a working sequence diagram of at least one embodiment of the driver module shown in FIG. 3.

Figure 5:
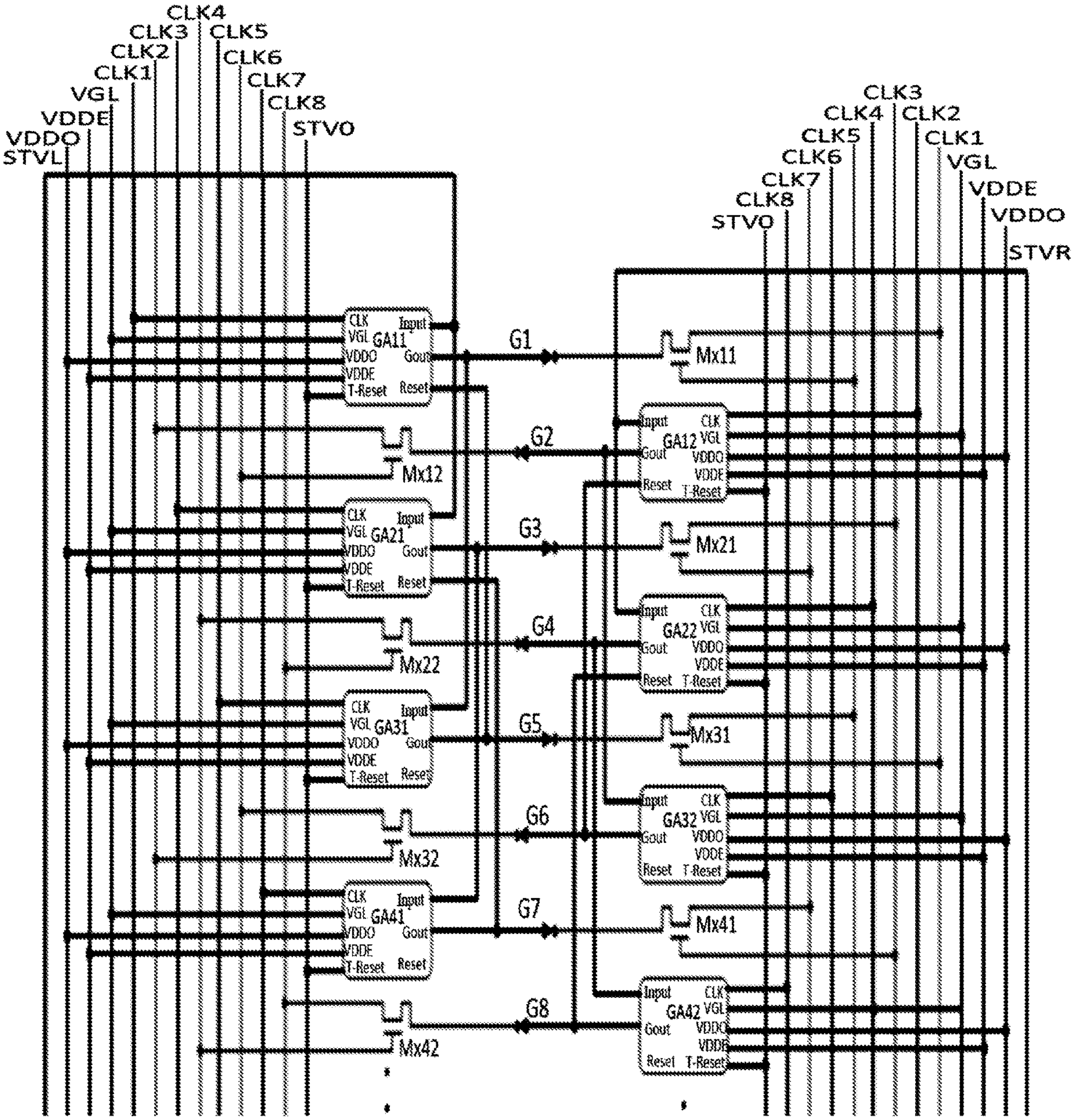
FIG. 5 is a circuit diagram of the driver module according to at least one embodiment of the present disclosure.

When the first driver unit and the second driver unit use 8 clock signals, and the duty cycle of each clock signal is 50%, CLK1 and CLK5 are reciprocal signals, CLK2 and CLK6 are reciprocal signals, CLK3 and CLK7 are reciprocal signals, and CLK4 and CLK8 are reciprocal signals;

As shown in FIG. 5, the first driver unit includes a first-level first driver circuit GA11, a second level first driver circuit GA21, a third level first driver circuit GA31, and a fourth level first driver circuit GA41;

The second driver unit includes a first level second driver circuit GA12, a second level second driver circuit GA22, a third level second driver circuit GA32, and a fourth level second driver circuit GA42;

GA11 is electrically connected to a first clock signal line CLK1, that is, the first level first output clock signal line electrically connected to GA11 is the first clock signal line CLK1;

GA21 is electrically connected to a third clock signal line CLK3, that is, a second level first output clock signal line electrically connected to GA21 is the third clock signal line CLK3;

GA31 is electrically connected to a fifth clock signal line CLK5, that is, a third level first output clock signal line electrically connected to GA31 is the fifth clock signal line CLK5;

GA41 is electrically connected to a seventh clock signal line CLK7, that is, a fourth level first output clock signal line electrically connected to GA41 is the seventh clock signal line CLK7;

GA12 is electrically connected to a second clock signal line CLK2, that is, a first level second output clock signal line electrically connected to GA12 is the second clock signal line CLK2;

GA22 is electrically connected to a fourth clock signal line CLK4, that is, a second level second output clock signal line electrically connected to GA22 is the fourth clock signal line CLK4;

GA32 is electrically connected to a sixth clock signal line CLK6, that is, a third level second output clock signal line electrically connected to GA32 is the sixth clock signal line CLK6;

GA42 is electrically connected to an eighth clock signal line CLK8, that is, a fourth level second output clock signal line electrically connected to GA42 is the eighth clock signal line CLK8;

The first control unit includes a first first-control circuit, a second first-control circuit, a third first-control circuit, and a fourth first-control circuit;

The second control unit includes a first second-control circuit, a second second-control circuit, a third second-control circuit, and a fourth second-control circuit;

The first first-control circuit includes a first control transistor Mx11, the second first-control circuit includes a second first-control transistor Mx21, the third first-control circuit includes a third first-control transistor Mx31, and the fourth first-control circuit includes a fourth first-control transistor Mx41;

The first second-control circuit includes a first second-control transistor Mx12, the second second-control circuit includes a second second-control transistor Mx22, the third second-control circuit includes a third second-control transistor Mx32, and the fourth second-control circuit includes a fourth second-control transistor Mx42;

A gate of Mx11 is electrically connected to the fifth clock signal line CLK5, a source of Mx11 is electrically connected to a right terminal of a first row gate line G1, and a drain of Mx11 is electrically connected to the first clock signal line CLK1;

A gate of Mx21 is electrically connected to the seventh clock signal line CLK7, a source of Mx21 is electrically connected to a right terminal of a third row gate line G3, and a drain of Mx21 is electrically connected to the third clock signal line CLK3;

A gate of Mx31 is electrically connected to the first clock signal line CLK1, a source of Mx31 is electrically connected to a right terminal of a fifth row gate line G5, and a drain of Mx31 is electrically connected to the fifth clock signal line CLK5;

A gate of Mx41 is electrically connected to the third clock signal line CLK3, a source of Mx41 is electrically connected to a right terminal of a seventh row gate line G7, and a drain of Mx41 is electrically connected to the seventh clock signal line CLK7;

A gate of Mx12 is electrically connected to the sixth clock signal line CLK6, a source of Mx12 is electrically connected to a left terminal of a second row gate line G2, and a drain of Mx12 is electrically connected to the second clock signal line CLK2;

A gate of Mx22 is electrically connected to the eighth clock signal line CLK8, a source of Mx22 is electrically connected to a left terminal of a fourth row gate line G4, and a drain of Mx22 is electrically connected to the fourth clock signal line CLK4;

A gate of Mx32 is electrically connected to the second clock signal line CLK2, a source of Mx32 is electrically connected to a left terminal of a sixth row gate line G6, and a drain of M32 is electrically connected to the sixth clock signal line CLK6;

A gate of Mx42 is electrically connected to the fourth clock signal line CLK4, a source of Mx42 is electrically connected to a left terminal of an eighth row gate line G8, and a drain of M42 is electrically connected to the eighth clock signal line CLK8.

In at least one embodiment shown in FIG. 5, all transistors are n-type transistors, but not limited to this.

In at least one embodiment shown in FIG. 5, the symbol STV0 is a frame starting voltage terminal, the symbol VDDO is a first control voltage terminal, the symbol VDDE is a second control voltage terminal, the symbol STVR is a right starting voltage terminal, and the symbol STVL is a left starting voltage terminal.

In FIG. 5, each first control transistor is set on the right side, and each second control transistor is set on the left side. That is to say, each first control transistor is set on the opposite side of a first driver module, and each second control transistor is set on the opposite side of a second driver module.

Optionally, the n-th level second driver circuit includes an n-th level second driver transistor;

A gate of the n-th level second driver transistor is electrically connected to the n-th level second pull-up node, the first pole of the n-th level second driver transistor is electrically connected to the n-th level second output clock signal line, and a second pole of the n-th level second driver transistor is electrically connected to the n-th level second drive signal output terminal;

A channel width of the n-th second control transistor is greater than or equal to a third width but less than or equal to a fourth width;

A channel length of the n-th second control transistor is greater than a channel length of the n-th level second driver transistor;

The third width is half of a channel width of the n-th level second driver transistor;

The fourth width is 1.5 times the channel width of the n-th level second driver transistor.

In specific implementation, in order to ensure the effect of pulling down the far terminal of the gate line, an on-state current provided by the second control transistor needs to be equivalent to an on-state current of the second driver transistor on the near terminal.

The channel width of the n-th second control transistor can be equivalent to the channel width of the n-th level second driver transistor, and the channel length of the n-th second control transistor is greater than the channel length of the n-th level second driver transistor;

Moreover, due to the presence of the first control transistor, there is a risk of leaking electricity in the gate drive signal compared to single-sided drive designs without the second control transistor. Therefore, in order to reduce the impact of leaking electricity, the channel length of the n-th second control transistor can be greater than the channel length of the n-th level second driver transistor. At this time, the channel width of the n-th second control transistor can be equivalent to the channel width of the n-th level second driver transistor.

In at least one embodiment disclosed herein, an a-th first control circuit included in the first control unit is configured to control a connection between a second terminal of an a-th row first gate line and the first voltage signal terminal under control of an a-th first control signal provided by an a-th first control terminal;

An a-th level first driver circuit included in the first driver unit is electrically connected to an a-th level first output clock signal line, configured to control the a-th level first output clock signal line to provide an a-th level first output clock signal to an a-th level first drive signal output terminal under control of a potential of an a-th level first pull-up node;

A b-th level second driver circuit included in the second driver unit is electrically connected to a b-th level second output clock signal line, configured to control the b-th level second output clock signal line to provide a b-th level second output clock signal to a b-th level second drive signal output terminal under control of a potential of a b-th level second pull-up node;

The a-th level first output clock signal line is configured to provide the a-th level first output clock signal, the b-th level second output clock signal line is configured to provide the b-th level second output clock signal, and the a-th level first output clock signal and the b-th level second output clock signal are reciprocal signals;

The a-th first control terminal is electrically connected to a b-th level second drive signal terminal included in the b-th level second driver circuit;

a and b are positive integers.

In specific implementation, the a-th first control circuit can control the connection between the second terminal of the a-th row first gate line and the first voltage signal terminal under the control of the b-th level second drive signal provided by the b-th level second drive signal terminal;

The a-th level first output clock signal and the b-th level second output clock signal are reciprocal signals.

Optionally, the a-th first control circuit includes an a-th first control transistor;

A gate of the a-th first control transistor is electrically connected to the b-th level second drive signal terminal, a first pole of the a-th first control transistor is electrically connected to the second terminal of the a-th row first gate line, and a second pole of the a-th first control transistor is electrically connected to the first voltage signal terminal.

In at least one embodiment disclosed herein, the first voltage signal terminal may be a low voltage line.

In at least one embodiment disclosed herein, a c-th second control circuit included in the second control unit is configured to control a connection between a first terminal of a c-th row second gate line and the second voltage signal terminal under control of a c-th second control signal provided by a c-th second control terminal;

A c-th level second driver circuit included in the second driver unit is electrically connected to a c-th level second output clock signal line, configured to control the c-th level second output clock signal line to provide a c-th level second output clock signal to a c-th level second drive signal output terminal under control of a potential of a c-th level second pull-up node;

A d-th level first driver circuit included in the first driver unit is electrically connected to a d-th level first output clock signal line, configured to control the d-th level first output clock signal line to provide a d-th level first output clock signal to a d-th level first drive signal output terminal under control of a potential of a d-th level first pull-up node;

The d-th level first output clock signal line is configured to provide the d-th level first output clock signal, the c-th level second output clock signal line is configured to provide the c-th level second output clock signal, and the d-th level first output clock signal and the c-th level second output clock signal are reciprocal signals;

The c-th second control terminal is electrically connected to a d-th level first drive signal terminal included in the d-th first driver circuit;

c and d are positive integers.

In specific implementation, the c-th second control circuit can control the connection between the first terminal of the c-th row second gate line and the second voltage signal terminal under the control of the d-th level first drive signal provided by the d-th level first drive signal terminal;

The d-th level first output clock signal and the c-th level second output clock signal are reciprocal signals.

Optionally, the c-th second control circuit includes a c-th second control transistor;

A gate of the c-th second control transistor is electrically connected to the d-th level first drive signal terminal, a first pole of the c-th second control transistor is electrically connected to the first terminal of the c-th row second gate line, and a second pole of the c-th second control transistor is electrically connected to the second voltage signal terminal.

In at least one embodiment disclosed herein, the second voltage signal terminal may be a low voltage line.

Figure 6:
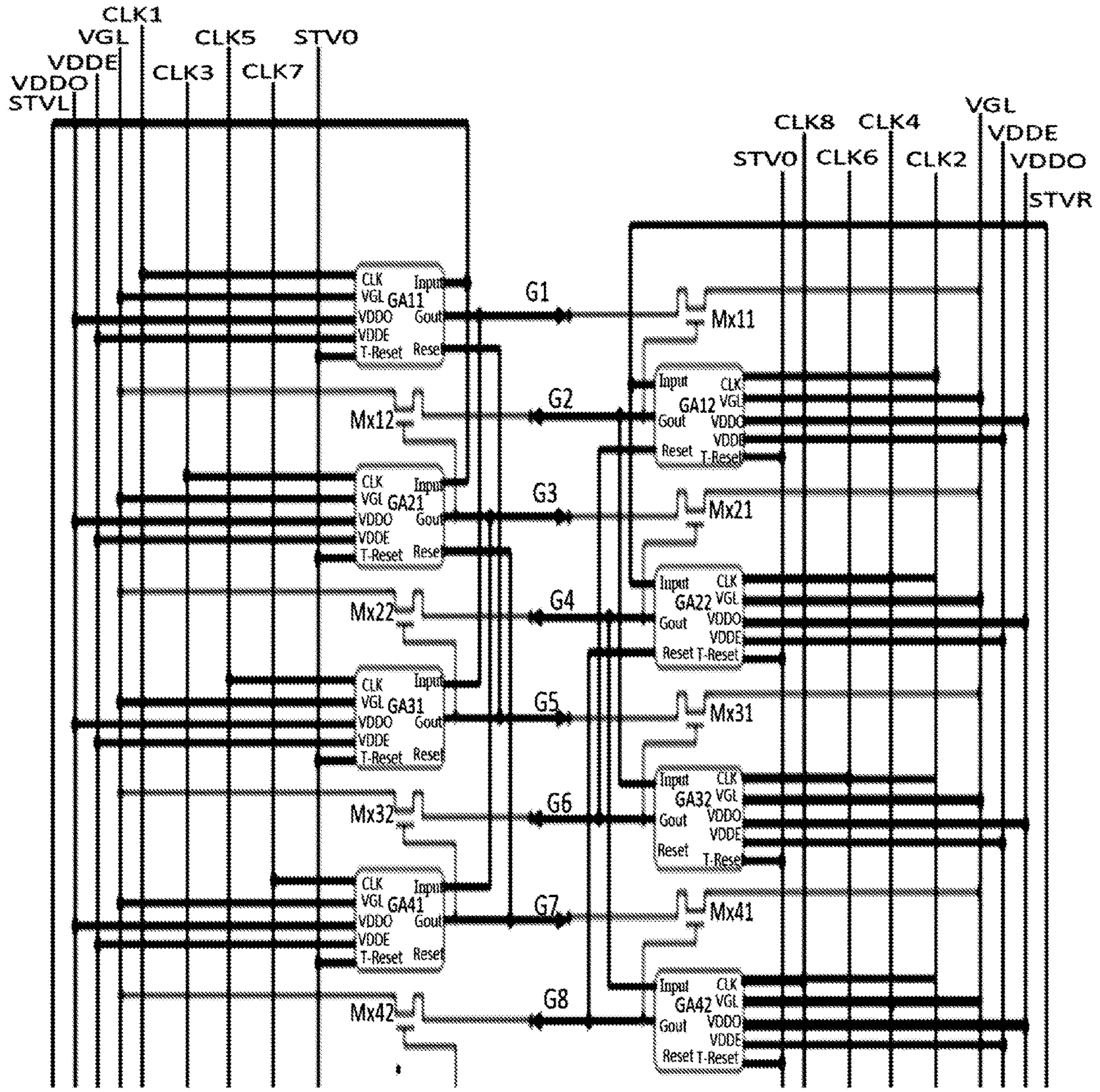
FIG. 6 is a circuit diagram of the driver module according to at least one embodiment of the present disclosure.

When the first driver unit and the second driver unit use 8 clock signals, and the duty cycle of each clock signal is 12.5%, CLK1 and CLK2 are reciprocal signals, CLK2 and CLK3 are reciprocal signals, CLK3 and CLK4 are reciprocal signals, CLK4 and CLK5 are reciprocal signals, CLK5 and CLK6 are reciprocal signals, CLK6 and CLK7 are reciprocal signals, CLK7 and CLK8 are reciprocal signals, CLK8 and CLK1 are reciprocal signals;

As shown in FIG. 6, the first driver unit includes a first-level first driver circuit GA11, a second level first driver circuit GA21, a third level first driver circuit GA31, and a fourth level first driver circuit GA41;

The second driver unit includes a first level second driver circuit GA12, a second level second driver circuit GA22, a third level second driver circuit GA32, and a fourth level second driver circuit GA42;

- GA11 is electrically connected to a first clock signal line CLK1, that is, a first level first output clock signal line electrically connected to GA11 is the first clock signal line CLK1;
- GA21 is electrically connected to a third clock signal line CLK3, that is, a second level first output clock signal line electrically connected to GA21 is the third clock signal line CLK3;
- GA31 is electrically connected to a fifth clock signal line CLK5, that is, a third level first output clock signal line electrically connected to GA31 is the fifth clock signal line CLK5;
- GA41 is electrically connected to a seventh clock signal line CLK7, that is, a fourth level first output clock signal line electrically connected to GA41 is the seventh clock signal line CLK7;
- GA12 is electrically connected to a second clock signal line CLK2, that is, a first level second output clock signal line electrically connected to GA12 is the second clock signal line CLK2;
- GA22 is electrically connected to a fourth clock signal line CLK4, that is, a second level second output clock signal line electrically connected to GA22 is the fourth clock signal line CLK4;
- GA32 is electrically connected to a sixth clock signal line CLK6, that is, a third level second output clock signal line electrically connected to GA32 is the sixth clock signal line CLK6;
- GA42 is electrically connected to an eighth clock signal line CLK8, that is, a fourth level second output clock signal line electrically connected to GA42 is the eighth clock signal line CLK8;

The first control unit includes a first first-control circuit, a second first-control circuit, a third first-control circuit, and a fourth first-control circuit;

The second control unit includes a first second-control circuit, a second second-control circuit, a third second-control circuit, and a fourth second-control circuit;

The first first-control circuit includes a first control transistor Mx11, the second first-control circuit includes a second first-control transistor Mx21, the third first-control circuit includes a third first-control transistor Mx31, and the fourth first-control circuit includes a fourth first-control transistor Mx41;

The first second-control circuit includes a first second-control transistor Mx12, the second second-control circuit includes a second second-control transistor Mx22, the third second-control circuit includes a third second-control transistor Mx32, and the fourth second-control circuit includes a fourth second-control transistor Mx42;

A gate of Mx11 is electrically connected to a drive signal output terminal of GA12, a source of Mx11 is electrically connected to a right terminal of a first row gate line G1, and a drain of Mx11 is electrically connected to a low-voltage line VGL;

A gate of Mx21 is electrically connected to a drive signal output terminal of GA22, a source of Mx21 is electrically connected to a right terminal of a third row gate line G3, and a drain of Mx21 is electrically connected to the low-voltage line VGL;

A gate of Mx31 is electrically connected to a drive signal output terminal of GA32, a source of Mx31 is electrically connected to a right terminal of a fifth row gate line G5, and a drain of Mx31 is electrically connected to the low-voltage line VGL;

A gate of Mx41 is electrically connected to a drive signal output terminal of GA42, a source of Mx41 is electrically connected to a right terminal of a seventh row gate line G7, and a drain of Mx41 is electrically connected to the low-voltage line VGL;

A gate of Mx12 is electrically connected to a drive signal output terminal of GA11, a source of Mx12 is electrically connected to a left terminal of a second row gate line G2, and a drain of Mx12 is electrically connected to the low-voltage line VGL;

A gate of Mx22 is electrically connected to a drive signal output terminal of GA21, a source of Mx22 is electrically connected to a left terminal of a fourth row gate line G4, and a drain of Mx22 is electrically connected to the low-voltage line VGL;

A gate of Mx32 is electrically connected to a drive signal output terminal of GA31, a source of Mx32 is electrically connected to a left terminal of a sixth row gate line G6, and a drain of Mx32 is electrically connected to the low-voltage line VGL;

A gate of Mx42 is electrically connected to a drive signal output terminal of GA41, a source of Mx42 is electrically connected to a left terminal of an eighth row gate line G8, and a drain of Mx42 is electrically connected to the low-voltage line VGL.

In at least one embodiment of the driver module shown in FIG. 6, all transistors are n-type transistors, but not limited to this.

In at least one embodiment shown in FIG. 6, the symbol STV0 is a frame starting voltage terminal, the symbol VDDO is a first control voltage terminal, the symbol VDDE is a second control voltage terminal, the symbol STVR is a right starting voltage terminal, and the symbol STVL is a left starting voltage terminal.

In FIG. 6, each first control transistor is set on the right side, and each second control transistor is set on the left side. That is to say, each first control transistor is set on the opposite side of a first driver module, and each second control transistor is set on the opposite side of a second driver module.

Figure 7:
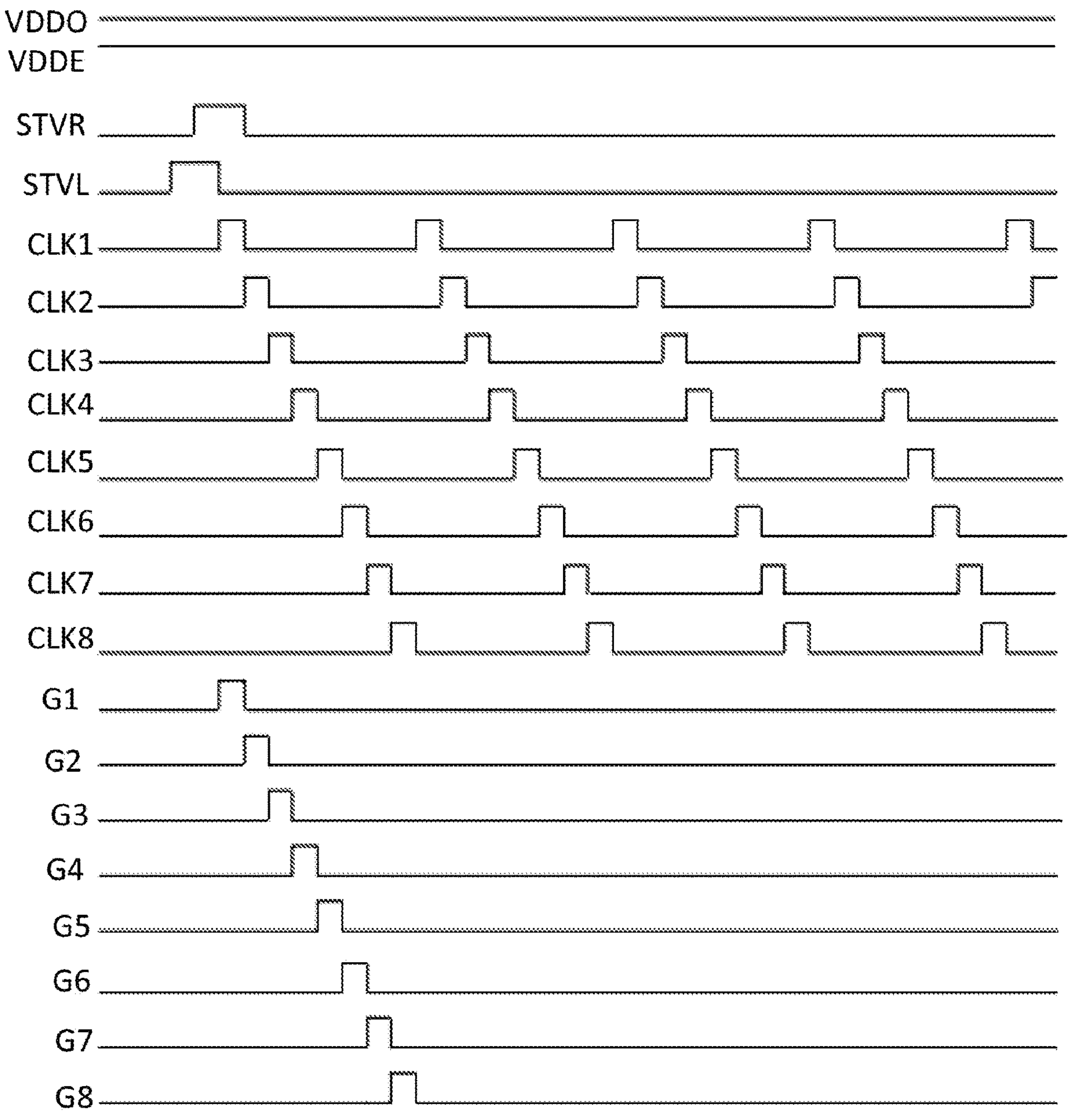
FIG. 7 is a working sequence diagram of at least one embodiment of the driver module shown in FIG. 6.

FIG. 7 is a working sequence diagram of at least one embodiment of the driver module shown in FIG. 6.

In at least one embodiment disclosed herein, an a-th first control circuit included in the first control unit is configured to control a connection between a second terminal of the a-th row first gate line and a first voltage signal terminal under control of an a-th first control signal provided by an a-th first control terminal.

An a-th level first driver circuit included in the first driver unit is electrically connected to an a-th level first output clock signal line, configured to control the a-th level first output clock signal line to provide an a-th level first output clock signal to an a-th level first drive signal output terminal under control of a potential of an a-th level first pull-up node;

An e-th level first driver circuit included in the first driver unit is electrically connected to an e-th level first output clock signal line, configured to control the e-th level first output clock signal line to provide an e-th level first output clock signal to an e-th level first drive signal output terminal under control of a potential of an e-th level first pull-up node;

The a-th level first output clock signal line is configured to provide the a-th level first output clock signal, the e-th level first output clock signal line is configured to provide the e-th level first output clock signal, and the a-th level first output clock signal and the e-th level first output clock signal are reciprocal signals;

The a-th first control terminal is electrically connected to an e-th level first drive signal terminal included in the e-th level first driver circuit;

a and e are positive integers.

Optionally, the a-th first control circuit includes an a-th first control transistor;

A gate of the a-th first control transistor is electrically connected to the e-th level first drive signal terminal, a first pole of the a-th first control transistor is electrically connected to the second terminal of the a-th row first gate line, and a second pole of the a-th first control transistor is electrically connected to the first voltage signal terminal.

Optionally, a c-th second control circuit included in the second control unit is configured to control a connection between a first terminal of the c-th row second gate line and a second voltage signal terminal under control of a c-th second control signal provided by a c-th second control terminal;

A c-th level second driver circuit included in the second driver unit is electrically connected to a c-th level second output clock signal line, configured to control the c-th level second output clock signal line to provide a c-th level second output clock signal to a c-th level second drive signal output terminal under control of a potential of a c-th level second pull-up node;

An f-th level second driver circuit included in the second driver unit is electrically connected to an f-th level second output clock signal line, configured to control the f-th level second output clock signal line to provide an f-th level second output clock signal to an f-th level second drive signal output terminal under control of a potential of an f-th level second pull-up node;

The c-th level second output clock signal line is configured to provide the c-th level second output clock signal, the f-th level second output clock signal line is configured to provide the f-th level second output clock signal, and the c-th level second output clock signal and the f-th level second output clock signal are reciprocal signals;

The c-th second control terminal is electrically connected to an f-th level second drive signal terminal included in the f-th level second driver circuit;

c and f are positive integers.

Optionally, the c-th second control circuit includes a c-th second control transistor;

A gate of the c-th second control transistor is electrically connected to the f-th level second drive signal terminal, a first pole of the c-th second control transistor is electrically connected to the first terminal of the c-th row second gate line, and a second pole of the c-th second control transistor is electrically connected to the second voltage signal terminal.

Figure 8:
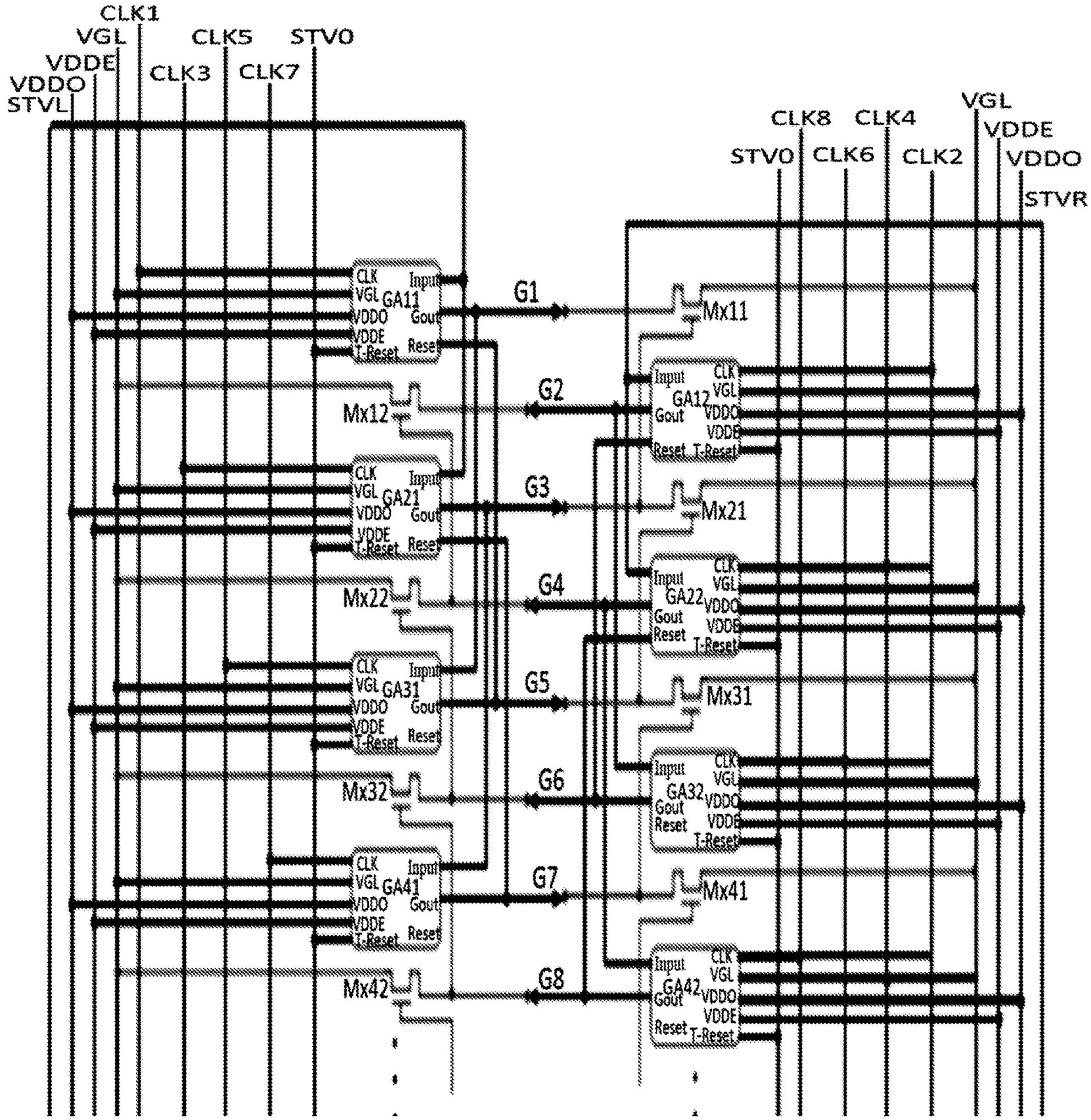
FIG. 8 is a circuit diagram of the driver module according to at least one embodiment of the present disclosure.

When the first driver unit and the second driver unit use 8 clock signals and the duty cycle of each clock signal is 25%, CLK1 and CLK3 are reciprocal signals, CLK2 and CLK4 are reciprocal signals, CLK3 and CLK5 are reciprocal signals, CLK4 and CLK6 are reciprocal signals, CLK5 and CLK7 are reciprocal signals, CLK6 and CLK8 are reciprocal signals, CLK7 and CLK1 are reciprocal signals, CLK8 and CLK2 are reciprocal signals;

As shown in FIG. 8, the first driver unit includes a first-level first driver circuit GA11, a second level first driver circuit GA21, a third level first driver circuit GA31, and a fourth level first driver circuit GA41;

The second driver unit includes a first level second driver circuit GA12, a second level second driver circuit GA22, a third level second driver circuit GA32, and a fourth level second driver circuit GA42;

GA11 is electrically connected to a first clock signal line CLK1, that is, a first level first output clock signal line electrically connected to GA11 is the first clock signal line CLK1;

GA21 is electrically connected to a third clock signal line CLK3, that is, a second level first output clock signal line electrically connected to GA21 is the third clock signal line CLK3;

GA31 is electrically connected to a fifth clock signal line CLK5, that is, a third level first output clock signal line electrically connected to GA31 is the fifth clock signal line CLK5;

GA41 is electrically connected to a seventh clock signal line CLK7, that is, a fourth level first output clock signal line electrically connected to GA41 is the seventh clock signal line CLK7;

GA12 is electrically connected to a second clock signal line CLK2, that is, a first level second output clock signal line electrically connected to GA12 is the second clock signal line CLK2;

GA22 is electrically connected to a fourth clock signal line CLK4, that is, a second level second output clock signal line electrically connected to GA22 is the fourth clock signal line CLK4;

GA32 is electrically connected to a sixth clock signal line CLK6, that is, a third level second output clock signal line electrically connected to GA32 is the sixth clock signal line CLK6;

GA42 is electrically connected to an eighth clock signal line CLK8, that is, a fourth level second output clock signal line electrically connected to GA42 is the eighth clock signal line CLK8;

The first control unit includes a first first-control circuit, a second first-control circuit, a third first-control circuit, and a fourth first-control circuit;

The second control unit includes a first second-control circuit, a second second-control circuit, a third second-control circuit, and a fourth second-control circuit;

The first first-control circuit includes a first first-control transistor Mx11, the second first-control circuit includes a second first-control transistor Mx21, the third first-control circuit includes a third first-control transistor Mx31, and the fourth first-control circuit includes a fourth first-control transistor Mx41;

The first second-control circuit includes a first second-control transistor Mx12, the second second-control circuit includes a second second-control transistor Mx22, the third second-control circuit includes a third second-control transistor Mx32, and the fourth second-control circuit includes a fourth second-control transistor Mx42;

A gate of Mx11 is electrically connected to the drive signal output terminal of GA21, a source of Mx11 is electrically connected to a right terminal of a first row gate line G1, and a drain of Mx11 is electrically connected to a low-voltage line VGL;

A gate of Mx21 is electrically connected to the drive signal output terminal of GA31, a source of Mx21 is electrically connected to a right terminal of a third row gate line G3, and a drain of Mx21 is electrically connected to the low-voltage line VGL;

A gate of Mx31 is electrically connected to the drive signal output terminal of GA41, a source of Mx31 is electrically connected to a right terminal of a fifth row gate line G5, and a drain of Mx31 is electrically connected to the low-voltage line VGL;

A gate of Mx41 is electrically connected to the drive signal output terminal of a fifth level first driver circuit, a source of Mx41 is electrically connected to a right terminal of a seventh row gate line G7, and a drain of Mx41 is electrically connected to the low-voltage line VGL;

A gate of Mx12 is electrically connected to the drive signal output terminal of GA22, the source of Mx12 is electrically connected to a left terminal of a second row gate line G2, and a drain of Mx12 is electrically connected to the low-voltage line VGL;

A gate of Mx22 is electrically connected to the drive signal output terminal of GA32, a source of Mx22 is electrically connected to a left terminal of a fourth row gate line G4, and a drain of Mx22 is electrically connected to the low-voltage line VGL;

A gate of Mx32 is electrically connected to the drive signal output terminal of GA42, a source of Mx32 is electrically connected to a left terminal of a sixth row gate line G6, and a drain of Mx32 is electrically connected to the low-voltage line VGL;

A gate of Mx42 is electrically connected to the drive signal output terminal of a fifth level second driver circuit, a source of Mx42 is electrically connected to a left terminal of an eighth row gate line G8, and a drain of Mx42 is electrically connected to the low-voltage line VGL.

In at least one embodiment of the driver module shown in FIG. 8, all transistors are n-type transistors, but not limited to this.

In at least one embodiment shown in FIG. 8, the symbol STV0 is a frame starting voltage terminal, the symbol VDDO is a first control voltage terminal, the symbol VDDE is a second control voltage terminal, the symbol STVR is a right starting voltage terminal, and the symbol STVL is the left starting voltage terminal.

In FIG. 8, each first control transistor is set on the right side, and each second control transistor is set on the left side. That is to say, each first control transistor is set on the opposite side of a first driver module, and each second control transistor is set on the opposite side of a second driver module.

Figure 9:
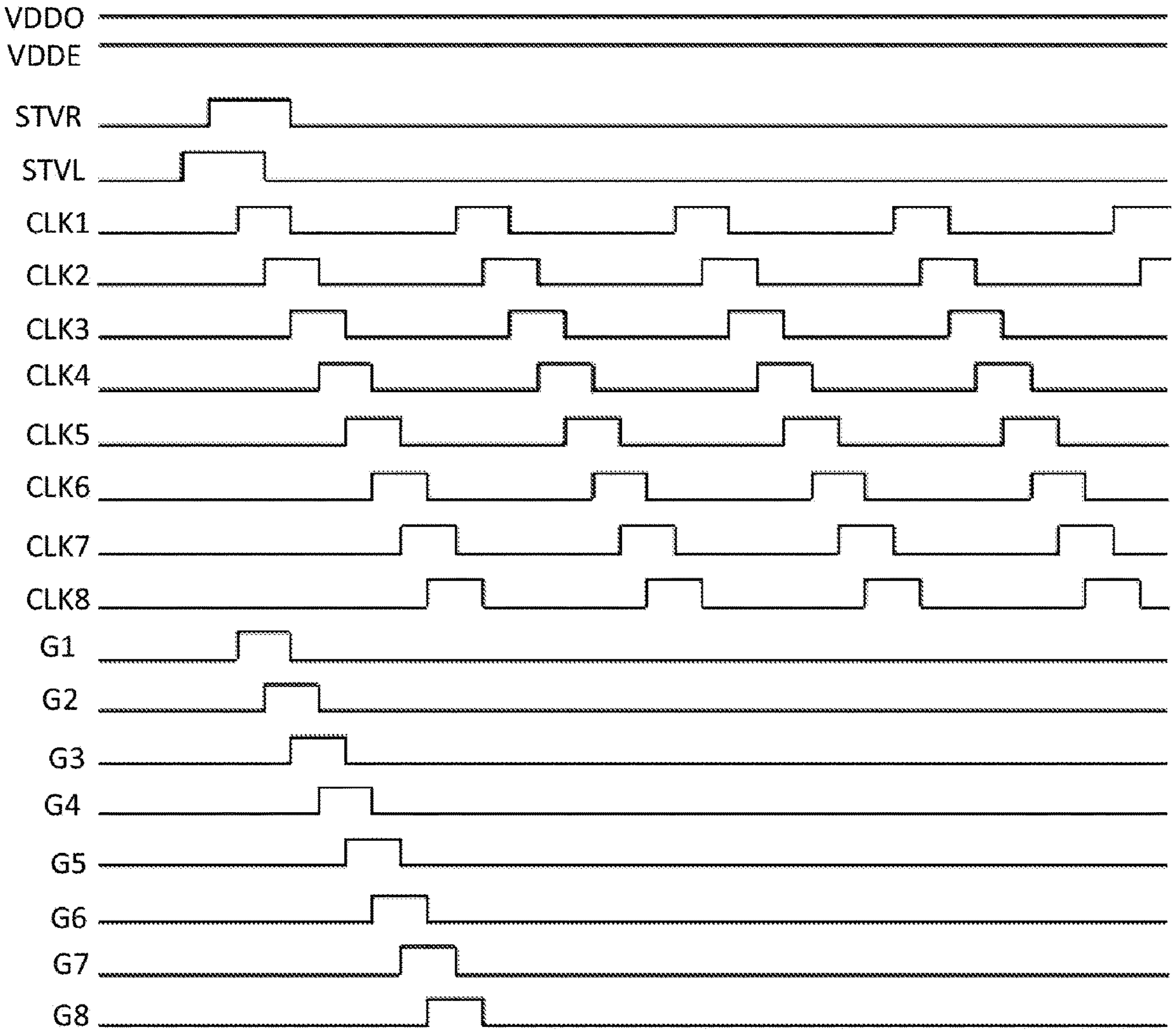
FIG. 9 is a working sequence diagram of at least one embodiment of the driver module shown in FIG. 8.

FIG. 9 is a working sequence diagram of at least one embodiment of the driver module shown in FIG. 8.

In at least one embodiment disclosed herein, the signal lines connected to the source of each control transistor need to meet the following characteristics: when the gate of each control transistor controls an opening of the control transistor, the source of the control transistor is connected to a low-level signal;

In one case, the source of the control transistor can be connected to the low-voltage line on the side where the control transistor is located;

In another case, the source of the control transistor can also be connected to a clock signal, the clock signal can be a reciprocal clock signal with the clock signal connected to the gate of the control transistor.

The display device described in the disclosed embodiments includes the above-mentioned driver module.

The above are merely the preferred embodiments of the present disclosure. It should be noted that, a person skilled in the art may make further improvements and modifications without departing from the principle of the present disclosure, and these improvements and modifications shall also fall within the scope of the present disclosure.

What is claimed is:

1. A driver module, applied to a display device including M rows of first gate lines; the driver module comprising: a first driver unit and a first control unit; wherein the first driver unit comprises M levels of first driver circuits; an m-th level first driver circuit comprises an m-th level first drive signal output terminal; M is a positive integer; m is a positive integer less than or equal to M;

the m-th level first drive signal output terminal is electrically connected to a first terminal of an m-th row first gate line, and is configured to provide an m-th level first drive signal to the m-th row first gate line through the m-th level first drive signal output terminal;

the first control unit comprises M first control circuits;

an m-th first control circuit comprised in the first control unit is electrically connected to a second terminal of the m-th row first gate line, and configured to control the second terminal of the m-th row first gate line to receive an ineffective voltage signal when a voltage value of the m-th level first drive signal changes from an effective voltage to an ineffective voltage;

the first terminal and the second terminal are opposite terminals;

wherein the m-th first control circuit is configured to control a connection between the second terminal of the m-th row first gate line and a first voltage signal terminal, under control of an m-th first control signal provided by an m-th first control terminal;

wherein the m-th level first driver circuit is electrically connected to an m-th level first output clock signal line, and configured to, under control of a potential of an m-th level first pull-up node, control the m-th level first output clock signal line to provide an m-th level first output clock signal to the m-th level first drive signal output terminal;

the m-th first control terminal is electrically connected to an m-th first control clock signal line;

the m-th first control clock signal line is configured to provide an m-th first control clock signal;

the m-th level first output clock signal and the m-th first control clock signal are reciprocal signals.

2. The driver module according to claim 1, wherein the display device further comprises N rows of second gate lines; the driver module further comprises a second driver unit and a second control unit; the second driver unit comprises N levels of second driver circuits; an n-th level second driver circuit comprises an n-th level second drive signal output terminal; N is a positive integer; n is a positive integer less than or equal to N;

the n-th level second drive signal output terminal is electrically connected to a second terminal of an n-th row second gate line, and configured to provide an n-th level second drive signal to the n-th row second gate line through the n-th level second drive signal output terminal;

the second control unit comprises N second control circuits;

an n-th second control circuit comprised in the second control unit is electrically connected to a first terminal of the n-th row second gate line, and configured to control the first terminal of the n-th row second gate line to receive an ineffective voltage signal when a voltage value of the n-th level second drive signal changes from an effective voltage to an ineffective voltage.

3. The driver module according to claim 2, wherein the n-th second control circuit is configured to, under control of an n-th second control signal provided by an n-th second control terminal, control a connection between the first terminal of the n-th row second gate line and a second voltage signal terminal.

4. The driver module according to claim 3, wherein the n-th second control circuit comprises an n-th second control transistor;

a gate of the n-th second control transistor is electrically connected to the n-th second control terminal, a first pole of the n-th second control transistor is electrically connected to the first terminal of the n-th row second gate line, and a second pole of the n-th second control transistor is electrically connected to the second voltage signal terminal;

or, wherein the n-th level second driver circuit is electrically connected to an n-th level second output clock signal line, and configured to, under control of a potential of an n-th level second pull-up node, control the n-th level second output clock signal line to provide an n-th level second output clock signal to the n-th level second drive signal output terminal;

the n-th second control terminal is electrically connected to an n-th second control clock signal line;

the n-th second control clock signal line is configured to provide an n-th second control clock signal;

the n-th level second output clock signal and the n-th second control clock signal are reciprocal signals.

5. The driver module according to claim 4, wherein the n-th level second driver circuit comprises an n-th level second driver transistor;

a gate of the n-th level second driver transistor is electrically connected to the n-th level second pull-up node, a first pole of the n-th level second driver transistor is electrically connected to the n-th level second output clock signal line, and a second pole of the n-th level second driver transistor is electrically connected to the n-th level second drive signal output terminal;

a channel width of the n-th second control transistor is greater than or equal to a third width but less than or equal to a fourth width;

a channel length of the n-th second control transistor is greater than a channel length of the n-th level second driver transistor;

the third width is half of a channel width of the n-th level second driver transistor;

the fourth width is 1.5 times the channel width of the n-th level second driver transistor.

6. The driver module according to claim 3, wherein the second voltage signal terminal is a direct current voltage signal terminal, and the second voltage signal terminal is configured to provide an ineffective voltage signal; or, wherein the second voltage signal terminal is electrically connected to the n-th level second output clock signal line.

7. The driver module according to claim 1, wherein, the m-th first control circuit comprises an m-th first control transistor;

a gate of the m-th first control transistor is electrically connected to the m-th first control terminal, a first pole of the m-th first control transistor is electrically connected to the second terminal of the m-th row first gate line, and a second pole of the m-th first control transistor is electrically connected to the first voltage signal terminal.

8. The driver module according to claim 7, wherein the m-th level first driver circuit comprises an m-th level first driver transistor;

a gate of the m-th level first driver transistor is electrically connected to the m-th level first pull-up node, a first pole of the m-th level first driver transistor is electrically connected to the m-th level first output clock signal line, and a second pole of the m-th level first driver transistor is electrically connected to the m-th level first drive signal output terminal;

a channel width of the m-th first control transistor is greater than or equal to a first width but less than or equal to a second width;

a channel length of the m-th first control transistor is greater than a channel length of the m-th level first driver transistor;

the first width is half of a channel width of the m-th level first driver transistor;

the second width is 1.5 times the channel width of the m-th level first driver transistor.

9. The driver module according to claim 1, wherein the first voltage signal terminal is a direct current voltage signal terminal, and the first voltage signal terminal is configured to provide an ineffective voltage signal.

10. The driver module according to claim 1, wherein the first voltage signal terminal is electrically connected to the m-th level first output clock signal line.

11. A display device, comprising the driver module according to claim 1.

12. A driver module, applied to a display device including M rows of first gate lines; the driver module comprising: a first driver unit and a first control unit; wherein the first driver unit comprises M levels of first driver circuits; an m-th level first driver circuit comprises an m-th level first drive signal output terminal; M is a positive integer; m is a positive integer less than or equal to M;

the m-th level first drive signal output terminal is electrically connected to a first terminal of an m-th row first gate line, and is configured to provide an m-th level first drive signal to the m-th row first gate line through the m-th level first drive signal output terminal;

the first control unit comprises M first control circuits;

an m-th first control circuit comprised in the first control unit is electrically connected to a second terminal of the m-th row first gate line, and configured to control the second terminal of the m-th row first gate line to receive an ineffective voltage signal when a voltage value of the m-th level first drive signal changes from an effective voltage to an ineffective voltage;

the first terminal and the second terminal are opposite terminals;

wherein the display device further comprises N rows of second gate lines; the driver module further comprises a second driver unit and a second control unit; the second driver unit comprises N levels of second driver circuits; an n-th level second driver circuit comprises an n-th level second drive signal output terminal; N is a positive integer; n is a positive integer less than or equal to N;

the n-th level second drive signal output terminal is electrically connected to a second terminal of an n-th row second gate line, and configured to provide an n-th level second drive signal to the n-th row second gate line through the n-th level second drive signal output terminal;

the second control unit comprises N second control circuits;

an n-th second control circuit comprised in the second control unit is electrically connected to a first terminal of the n-th row second gate line, and configured to control the first terminal of the n-th row second gate line to receive an ineffective voltage signal when a voltage value of the n-th level second drive signal changes from an effective voltage to an ineffective voltage;

wherein an a-th first control circuit comprised in the first control unit is configured to, under control of an a-th first control signal provided by an a-th first control terminal, control a connection between a second terminal of an a-th row first gate line and a first voltage signal terminal;

an a-th level first driver circuit comprised in the first driver unit is electrically connected to an a-th level first output clock signal line, and configured to, under control of a potential of an a-th level first pull-up node, control the a-th level first output clock signal line to provide an a-th level first output clock signal to an a-th level first drive signal output terminal;

a b-th level second driver circuit comprised in the second driver unit is electrically connected to a b-th level second output clock signal line, and configured to, under control of a potential of a b-th level second pull-up node, control the b-th level second output clock signal line to provide a b-th level second output clock signal to a b-th level second drive signal output terminal;

the a-th level first output clock signal line is configured to provide the a-th level first output clock signal, the b-th level second output clock signal line is configured to provide the b-th level second output clock signal, and the a-th level first output clock signal and the b-th level second output clock signal are reciprocal signals;

the a-th first control terminal is electrically connected to a b-th level second drive signal terminal comprised in the b-th level second driver circuit;

values a and b are positive integers.

13. The driver module according to claim 12, wherein the a-th first control circuit comprises an a-th first control transistor;

a gate of the a-th first control transistor is electrically connected to the b-th level second drive signal terminal, a first pole of the a-th first control transistor is electrically connected to the second terminal of the a-th row first gate line, and a second pole of the a-th first control transistor is electrically connected to the first voltage signal terminal.

14. The driver module according to claim 12, wherein, a c-th second control circuit comprised in the second control unit is configured to, under control of a c-th second control signal provided by a c-th second control terminal, control a connection between a first terminal of a c-th row second gate line and a second voltage signal terminal;

a c-th level second driver circuit comprised in the second driver unit is electrically connected to a c-th level second output clock signal line, and configured to, under control of a potential of a c-th level second pull-up node, control the c-th level second output clock signal line to provide a c-th level second output clock signal to a c-th level second drive signal output terminal;

a d-th level first driver circuit comprised in the first driver unit is electrically connected to a d-th level first output clock signal line, and configured to, under control of a potential of a d-th level first pull-up node, control the d-th level first output clock signal line to provide a d-th level first output clock signal to a d-th level first drive signal output terminal;

the d-th level first output clock signal line is configured to provide the d-th level first output clock signal, the c-th level second output clock signal line is configured to provide the c-th level second output clock signal, and the d-th level first output clock signal and the c-th level second output clock signal are reciprocal signals;

the c-th second control terminal is electrically connected to a d-th level first drive signal terminal comprised in the d-th first driver circuit;

values c and d are positive integers.

15. The driver module according to claim 14, wherein the c-th second control circuit comprises a c-th second control transistor;

a gate of the c-th second control transistor is electrically connected to the d-th level first drive signal terminal, a first pole of the c-th second control transistor is electrically connected to the first terminal of the c-th row second gate line, and a second pole of the c-th second control transistor is electrically connected to the second voltage signal terminal.

16. A driver module, applied to a display device including M rows of first gate lines; the driver module comprising: a first driver unit and a first control unit; wherein the first driver unit comprises M levels of first driver circuits; an m-th level first driver circuit comprises an m-th level first drive signal output terminal; M is a positive integer; m is a positive integer less than or equal to M;

the m-th level first drive signal output terminal is electrically connected to a first terminal of an m-th row first gate line, and is configured to provide an m-th level first drive signal to the m-th row first gate line through the m-th level first drive signal output terminal;

the first control unit comprises M first control circuits;

an m-th first control circuit comprised in the first control unit is electrically connected to a second terminal of the m-th row first gate line, and configured to control the second terminal of the m-th row first gate line to receive an ineffective voltage signal when a voltage value of the m-th level first drive signal changes from an effective voltage to an ineffective voltage;

the first terminal and the second terminal are opposite terminals:

wherein the display device further comprises N rows of second gate lines; the driver module further comprises a second driver unit and a second control unit; the second driver unit comprises N levels of second driver circuits; an n-th level second driver circuit comprises an n-th level second drive signal output terminal; N is a positive integer; n is a positive integer less than or equal to N;

the n-th level second drive signal output terminal is electrically connected to a second terminal of an n-th row second gate line, and configured to provide an n-th level second drive signal to the n-th row second gate line through the n-th level second drive signal output terminal;

the second control unit comprises N second control circuits;

an n-th second control circuit comprised in the second control unit is electrically connected to a first terminal of the n-th row second gate line, and configured to control the first terminal of the n-th row second gate line to receive an ineffective voltage signal when a voltage value of the n-th level second drive signal changes from an effective voltage to an ineffective voltage;

wherein an a-th first control circuit comprised in the first control unit is configured to, under control of an a-th first control signal provided by an a-th first control terminal, control a connection between a second terminal of an a-th row first gate line and a first voltage signal terminal;

an a-th level first driver circuit comprised in the first driver unit is electrically connected to an a-th level first output clock signal line, and configured to, under control of a potential of an a-th level first pull-up node, control the a-th level first output clock signal line to provide an a-th level first output clock signal to an a-th level first drive signal output terminal;

an e-th level first driver circuit comprised in the first driver unit is electrically connected to an e-th level first output clock signal line, and configured to, under control of a potential of an e-th level first pull-up node, control the e-th level first output clock signal line to provide an e-th level first output clock signal to an e-th level first drive signal output terminal;

the a-th level first output clock signal line is configured to provide the a-th level first output clock signal, the e-th level first output clock signal line is configured to provide the e-th level first output clock signal, and the a-th level first output clock signal and the e-th level first output clock signal are reciprocal signals;

the a-th first control terminal is electrically connected to an e-th level first drive signal terminal comprised in the e-th level first driver circuit;

values a and e are positive integers.

17. The driver module according to claim 16, wherein the a-th first control circuit comprises an a-th first control transistor;

a gate of the a-th first control transistor is electrically connected to the e-th level first drive signal terminal, a first pole of the a-th first control transistor is electrically connected to the second terminal of the a-th row first gate line, and a second pole of the a-th first control transistor is electrically connected to the first voltage signal terminal.

18. The driver module according to claim 16, wherein a c-th second control circuit comprised in the second control unit is configured to, under control of a c-th second control signal provided by a c-th second control terminal, control a connection between a first terminal of a c-th row second gate line and a second voltage signal terminal;

a c-th level second driver circuit comprised in the second driver unit is electrically connected to a c-th level second output clock signal line, and configured to, under control of a potential of a c-th level second pull-up node, control the c-th level second output clock signal line to provide a c-th level second output clock signal to a c-th level second drive signal output terminal;

an f-th level second driver circuit comprised in the second driver unit is electrically connected to an f-th level second output clock signal line, and configured to, under control of a potential of an f-th level second pull-up node, control the f-th level second output clock signal line to provide an f-th level second output clock signal to an f-th level second drive signal output terminal;

the c-th level second output clock signal line is configured to provide the c-th level second output clock signal, the f-th level second output clock signal line is configured to provide the f-th level second output clock signal, and the c-th level second output clock signal and the f-th level second output clock signal are reciprocal signals;

the c-th second control terminal is electrically connected to an f-th level second drive signal terminal comprised in the f-th level second driver circuit;

values c and f are positive integers.

19. The driver module according to claim 18, wherein the c-th second control circuit comprises a c-th second control transistor;

a gate of the c-th second control transistor is electrically connected to the f-th level second drive signal terminal, a first pole of the c-th second control transistor is electrically connected to the first terminal of the c-th row second gate line, and a second pole of the c-th second control transistor is electrically connected to the second voltage signal terminal.

* * * * *